(12) United States Patent
Tsuchida et al.

(10) Patent No.: US 6,618,055 B1
(45) Date of Patent: Sep. 9, 2003

(54) COMPUTER READABLE PROGRAM PRODUCT, METHOD OF IMAGE PROCESSING AND IMAGE PROCESSING SYSTEM

(75) Inventors: Yoshinori Tsuchida, Tokyo (JP); Hiroshi Minagawa, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 0 days.

(21) Appl. No.: 09/538,280

(22) Filed: Mar. 30, 2000

(30) Foreign Application Priority Data

Aug. 31, 1999 (JP) .......................................... 11-246471

(51) Int. Cl.⁷ .............................................. G06T 15/00
(52) U.S. Cl. ..................................................... 345/646
(58) Field of Search .............................. 345/423, 428, 345/646, 473, 475

(56) References Cited

U.S. PATENT DOCUMENTS 5,651,106 A * 7/1997 Ashburn ...................... 345/423

OTHER PUBLICATIONS

Bowyer et al. A Programmers Geometry. Butterworths. Section 7.10 Angle Between Two Planes. p. 110. 1983.*
Hoppe et al. "Mesh Optimization" ACM SIGGRAPH pp19–25 1993.*

English Language Translation of Japanese Patent Publication No. 11–232489.

* cited by examiner

Primary Examiner—Almis R. Jankus
(74) Attorney, Agent, or Firm—Greenblum & Bernstein, P.L.C.

(57) ABSTRACT

A method of image processing where a location of a three-dimensional object to be displayed by a quadrilateral polygon is displayed as a natural concave/convex shape and thereby the mode of change of the form of the three-dimensional object is displayed without a strange feeling, includes drawing and recording a quadrilateral polygon designated for division. The method also includes provisionally dividing that quadrilateral polygon into two triangular planes by a separating line connecting two facing vertexes, and judging if the two triangular planes form a convex shape facing the outside of the three-dimensional object. The method also includes dividing the quadrilateral polygon by that provisional division pattern if forming a convex shape, and dividing the quadrilateral polygon by another division pattern using a separating line connecting the remaining two vertexes if forming a concave shape so that the two triangular planes form a convex shape facing the outside of the three-dimensional object. Thus, the location of the three-dimensional object displayed by the quadrilateral polygon is displayed to form a convex shape facing the outside.

22 Claims, 22 Drawing Sheets

Fig.4

| OBJECT ID NO. | POLYGON ID NO. | VERTEX ID NO. | DIVISION DESIGNATION FLAG |
|---|---|---|---|
| M1 | P1 | V1, V2, V3 | 0 |
|  | P2 | V3, V2, V4, V5 | 1 |
|  | P3 | V5, V4, V6 | 0 |
|  | ⋮ | ⋮ | ⋮ |
| M2 | P1 | V1, V2, V3, V4 | 1 |
|  | P2 | V4, V3, V5 | 0 |
|  | P3 | V5, V6, V4 | 0 |
|  | P4 | V4, V6, V7 | 0 |
|  | ⋮ | ⋮ | ⋮ |
| ⋮ | ⋮ | ⋮ | ⋮ |

| OBJECT ID NO. | VERTEX ID NO. | COORDINATE DATA |
|---|---|---|
| M1 | V1 | ($X_{a1}$, $Y_{a1}$, $Z_{a1}$) |
| | V2 | ($X_{a2}$, $Y_{a2}$, $Z_{a2}$) |
| | V3 | ($X_{a3}$, $Y_{a3}$, $Z_{a3}$) |
| | V4 | ($X_{a4}$, $Y_{a4}$, $Z_{a4}$) |
| | V5 | ($X_{a5}$, $Y_{a5}$, $Z_{a5}$) |
| | V6 | ($X_{a6}$, $Y_{a6}$, $Z_{a6}$) |
| | ⋮ | ⋮ |
| M2 | V1 | ($X_{b1}$, $Y_{b1}$, $Z_{b1}$) |
| | V2 | ($X_{b2}$, $Y_{b2}$, $Z_{b2}$) |
| | V3 | ($X_{b3}$, $Y_{b3}$, $Z_{b3}$) |
| | V4 | ($X_{b4}$, $Y_{b4}$, $Z_{b4}$) |
| | V5 | ($X_{b5}$, $Y_{b5}$, $Z_{b5}$) |
| | V6 | ($X_{b6}$, $Y_{b6}$, $Z_{b6}$) |
| | ⋮ | ⋮ |
| ⋮ | ⋮ | ⋮ |

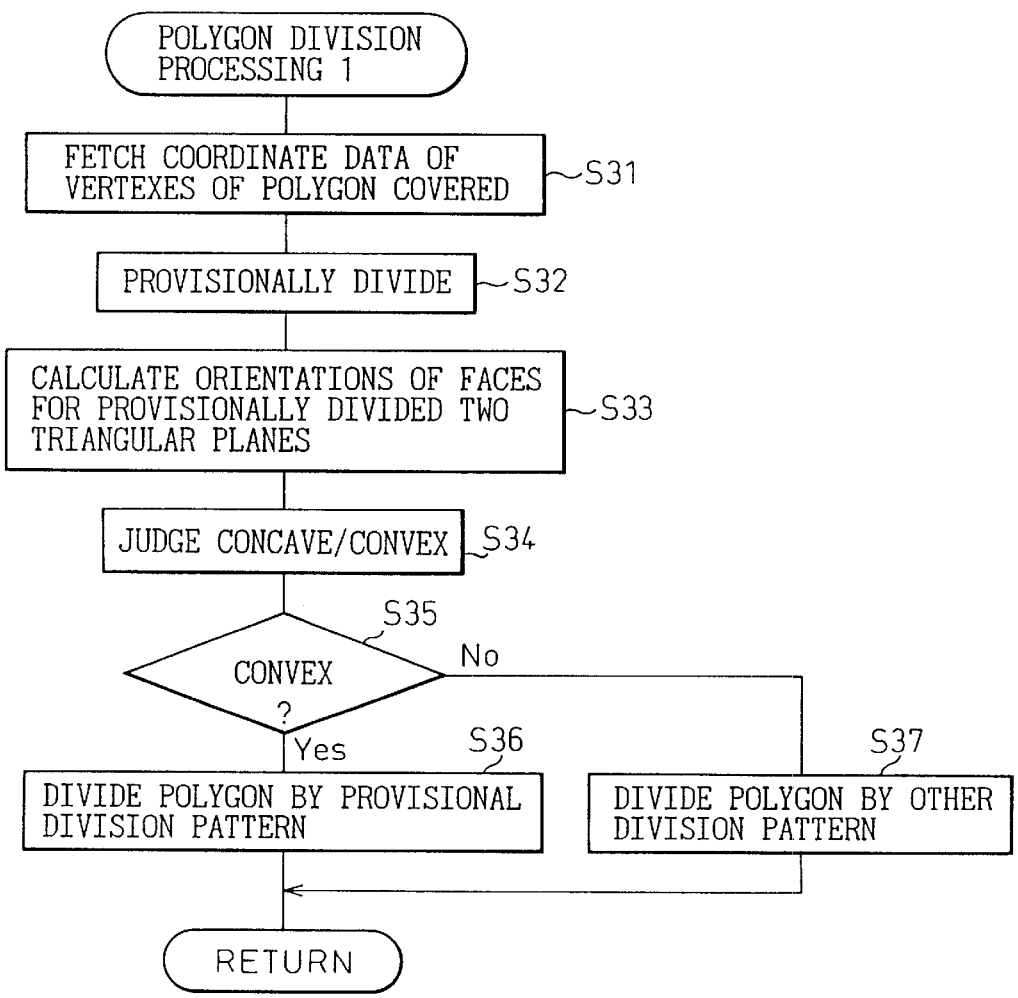

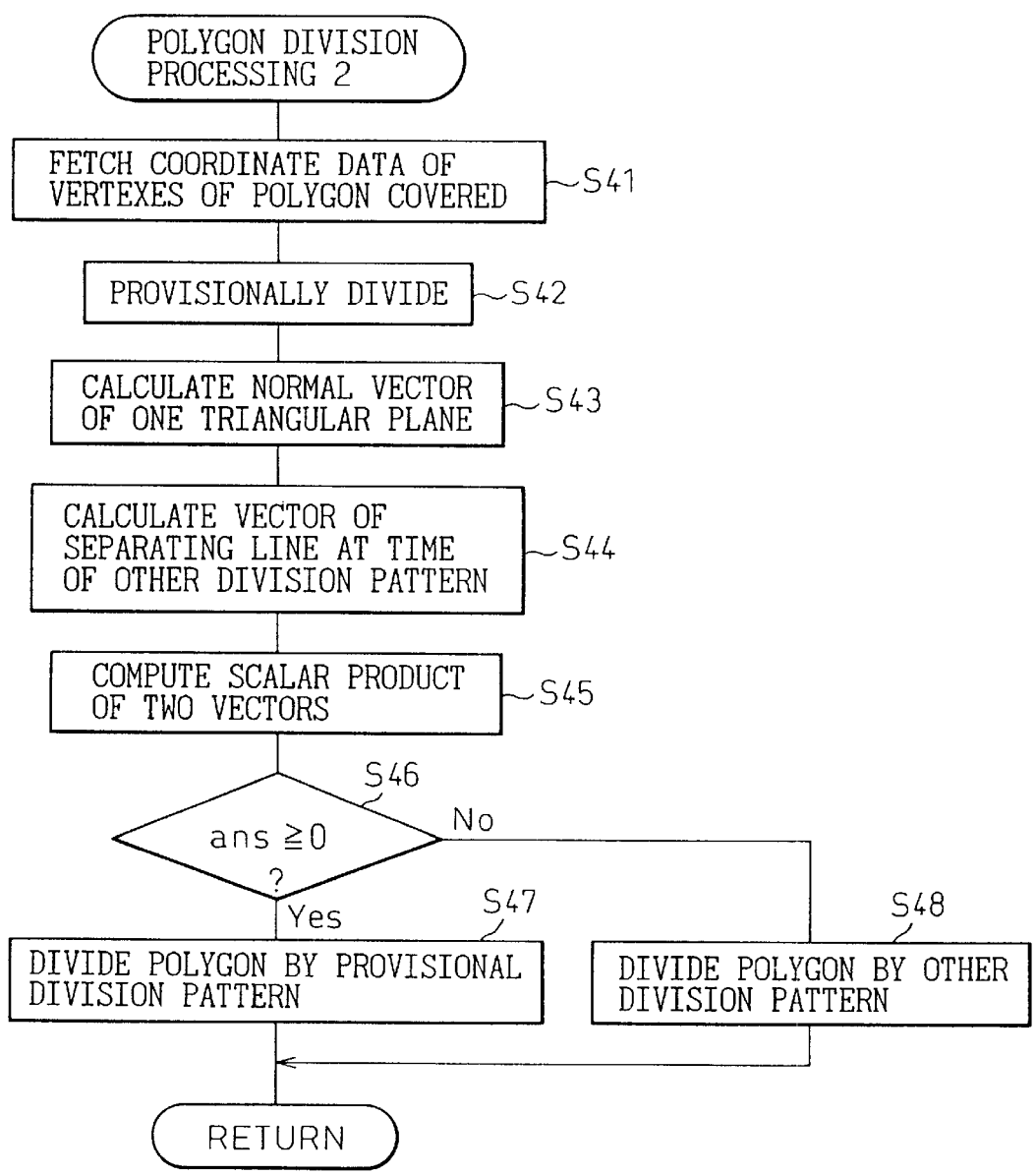

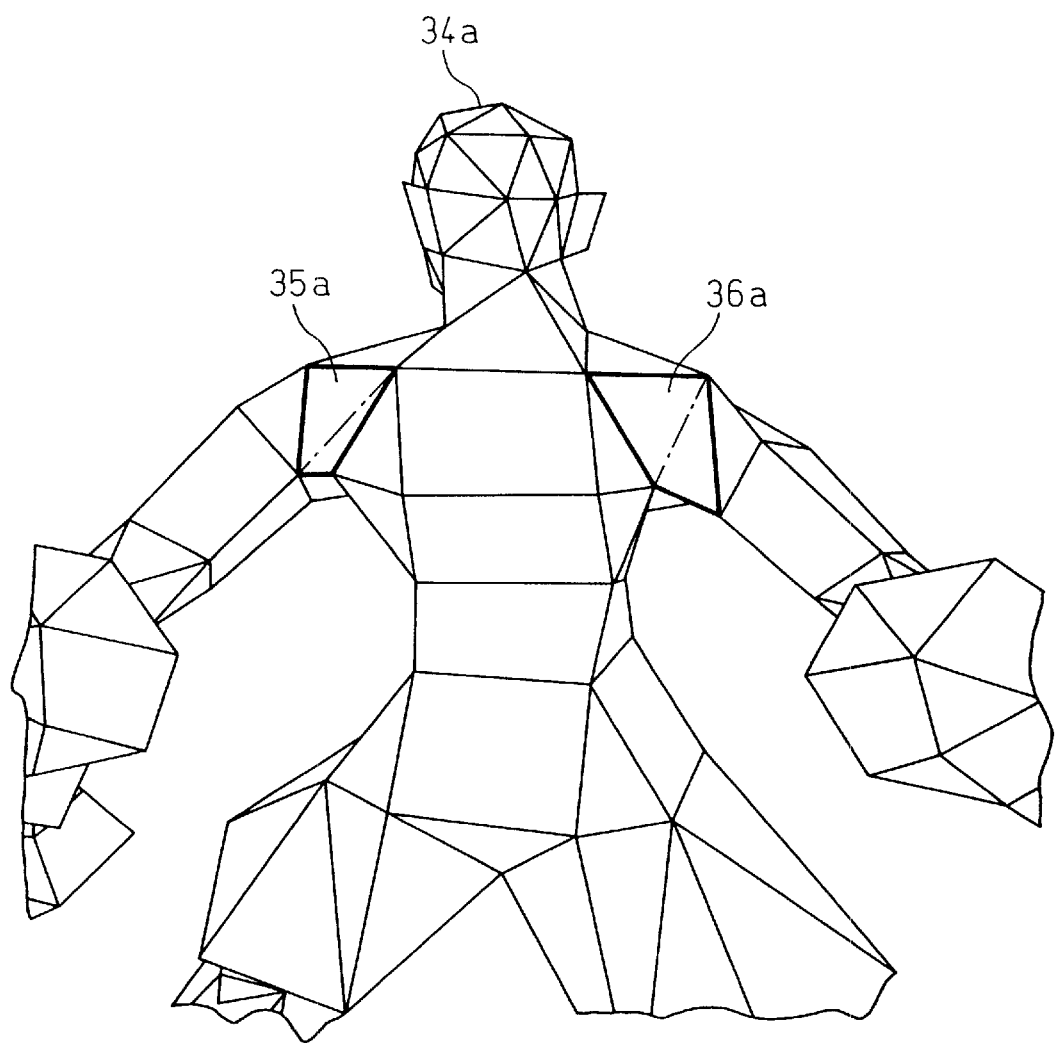

Fig. 21

| OBJECT ID NO. | POLYGON ID NO. | VERTEX ID NO. | DIVISION DESIGNATION FLAG | DIVISION TYPE |
|---|---|---|---|---|
| M1 | P1 | V1<br>V2<br>V3 | 0 | 0 |
| | P2 | V3<br>V2<br>V4<br>V5 | 1 | 0 |
| | P3 | V5<br>V4<br>V6 | 0 | 0 |
| | ⋮ | ⋮ | ⋮ | ⋮ |
| M2 | P1 | V1<br>V2<br>V3<br>V4 | 1 | 1 |
| | P2 | V4<br>V3<br>V5 | 0 | 0 |
| | P3 | V5<br>V6<br>V4 | 0 | 0 |
| | P4 | V4<br>V6<br>V7 | 0 | 0 |
| | ⋮ | ⋮ | ⋮ | ⋮ |
| ⋮ | ⋮ | ⋮ | ⋮ | ⋮ |

COMPUTER READABLE PROGRAM PRODUCT, METHOD OF IMAGE PROCESSING AND IMAGE PROCESSING SYSTEM

BACKGROUND OF THE INVENTION

1. Field of the Invention

The present invention relates to a program product storing a program for controlling image processing in a video game etc., a method of image processing, and an image processing system.

2. Description of the Related Art

In recent years, three-dimensional games (3D games) have garnered attention as types of video games. In 3D games, three-dimensional objects for display are arranged in a virtual three-dimensional space. The arranged three-dimensional objects are displayed on a screen by perspective transformation. The three-dimensional objects includes a player character operated by the player, an enemy character, and other objects displayed on the screen during the progress of the game.

In such a 3D game, the three-dimensional objects for display are comprised of combinations of polygons, which are triangular, quadrilateral, and other polylateral planes. That is, the surface of the object for display is expressed as a combination of triangular and other planes.

The form of a three-dimensional object displayed on the screen during the progress of the game changes in various ways in accordance with the state of progress of the game, input operation, etc. For example, when displaying the state of movement of a man-shaped character, the form of the three-dimensional object changes in accordance with movement of the arms and legs or twisting of the torso, etc. Along with the changes in the form of the three-dimensional object, the state of the character walking or running is expressed.

When the form of the three-dimensional object changes in this way, the positions, shapes, etc. of the polygons comprising the three-dimensional object sequentially change. Therefore, computations relating to the positions or shapes of the polygons of the object for display are sequentially executed. The change in the form of the three-dimensional object is displayed based on the result of the computation.

Summarizing the problem to be solved by the invention, when the form of the three-dimensional object changes, there is a possibility of movement, rotation, twisting, torsion, elongation, contraction, deformation, etc. occurring in the quadrilateral polygon. At that time, the expression of the location using the quadrilateral polygon is liable to become unnatural due to factors such as the position of the view point.

For example, consider the case where a location on the back of a man-shaped character from a shoulder to an armpit is comprised of a single quadrilateral polygon. When the character moves its arm or twists its body, part of the shoulder which should inherently not be missing may be displayed missing depending on the method of twisting or method of torsion of the quadrilateral polygon.

Unnatural display of the three-dimensional object in this way gives rise to a strange feeling in the mode of display of the change of form of the three-dimensional object. To prevent such a situation from occurring, it is important to specially devise a method of drawing (method of displaying) the polygons comprising the three-dimensional object.

SUMMARY OF THE INVENTION

An object of the present invention is to enable the mode of change of form of a three-dimensional object to be displayed without a strange feeling.

According to a first aspect of the present invention, there is provided a computer readable program product for storing a game program, which product stores a program making the computer draw a three-dimensional object comprised of a plurality of polygons including quadrilateral polygons, judge whether a quadrilateral polygon, divided into two triangular planes with a straight line connecting the pair of facing vertexes forming a ridge line, is formed in a concave or convex shape about the ridge line, and change the ridge line to a straight line connecting the other pair of facing vertexes of the quadrilateral polygon when it is judged that the quadrilateral polygon is formed in a concave or convex shape.

According to a second aspect of the present invention, there is provided a computer readable program product for storing a game program, which product stores a program making the computer draw a game character comprised of a plurality of polygons including quadrilateral polygons, judge whether a quadrilateral polygon, divided into two triangular planes with a straight line connecting the pair of facing vertexes forming a ridge line, is formed in a concave or convex shape about the ridge line when changing and drawing the form of the game character in response to an input operation of a player. The computer also changes the ridge line to a straight line connecting the other pair of facing vertexes of the quadrilateral polygon when it is judged that the quadrilateral polygon is formed in a concave or convex shape, and divides the quadrilateral polygon by the changed straight line to generate two independent triangular polygons.

According to a third aspect of the present invention, there is provided a method of image processing comprising drawing a three-dimensional object comprised of a plurality of polygons including quadrilateral polygons, judging whether a quadrilateral polygon, divided into two triangular planes with a straight line connecting the pair of facing vertexes forming a ridge line, is formed in a concave or convex shape about the ridge line, and changing the ridge line to a straight line connecting the other pair of facing vertexes of the quadrilateral polygon when it is judged that the quadrilateral polygon is formed in a concave or convex shape.

According to a fourth aspect of the present invention, there is provided a method of image processing comprising drawing a game character comprised of a plurality of polygons including quadrilateral polygons, judging whether a quadrilateral polygon, divided into two triangular planes with a straight line connecting the pair of facing vertexes forming a ridge line, is formed in a concave or convex shape about the ridge line when changing and drawing the form of the game character in response to an input operation of a player, changing the ridge line to a straight line connecting the other pair of facing vertexes of the quadrilateral polygon when it is judged that the quadrilateral polygon is formed in a concave or convex shape, and dividing the quadrilateral polygon by the changed straight line to generate two independent triangular polygons.

According to a fifth aspect of the present invention, there is provided a mechanism comprising a computer for controlling a program and a program product storing a program for making the computer control the game. The program makes the computer draw a three-dimensional object comprised of a plurality of polygons including quadrilateral polygons, judge whether a quadrilateral polygon, divided into two triangular planes with a straight line connecting the pair of facing vertexes forming a ridge line, is formed in a concave or convex shape about the ridge line, and change the ridge line to a straight line connecting the other pair of facing vertexes of the quadrilateral polygon when it is judged that the quadrilateral polygon is formed in a concave or convex shape.

According to a sixth aspect of the present invention, there is provided a mechanism comprising a computer for controlling a program and a program product storing a program for making the computer control the game. The program makes the computer draw a game character comprised of a plurality of polygons including quadrilateral polygons, judge whether a quadrilateral polygon, divided into two triangular planes with a straight line connecting the pair of facing vertexes forming a ridge line, is formed in a concave or convex shape about the ridge line when changing and drawing the form of the game character in response to an input operation of a player, change the ridge line to a straight line connecting the other pair of facing vertexes of the quadrilateral polygon when it is judged that the quadrilateral polygon is formed in a concave or convex shape, and divide the quadrilateral polygon by the changed straight line to generate two independent triangular polygons.

BRIEF DESCRIPTION OF THE DRAWINGS

These and other objects and features of the present invention will become clearer from the following description of the preferred embodiments given with reference to the attached drawings, in which:

FIG. 4 is a view of an example data structure of a polygon table stored in the RAM shown in FIG. 2;

FIG. 8 is a flow chart of polygon division processing of the first embodiment;

FIG. 11 is a flow chart of another example of the polygon division processing of the first embodiment;

FIG. 13 is a schematic view of a wire frame model showing the state of division of the quadrilateral polygon in a man-shaped three-dimensional object;

FIG. 21 is a view of a data structure of a polygon table stored in the RAM shown in FIG. 20;

DESCRIPTION OF THE PREFERRED EMBODIMENTS

Preferred embodiments of the present invention will be explained below with reference to the drawings. Note that while the following explanation will be given of the case of application of the present invention to a home game system, the present invention is not limited to home game system. Further, it is not limited to a video game.

First Embodiment

Figure 1:
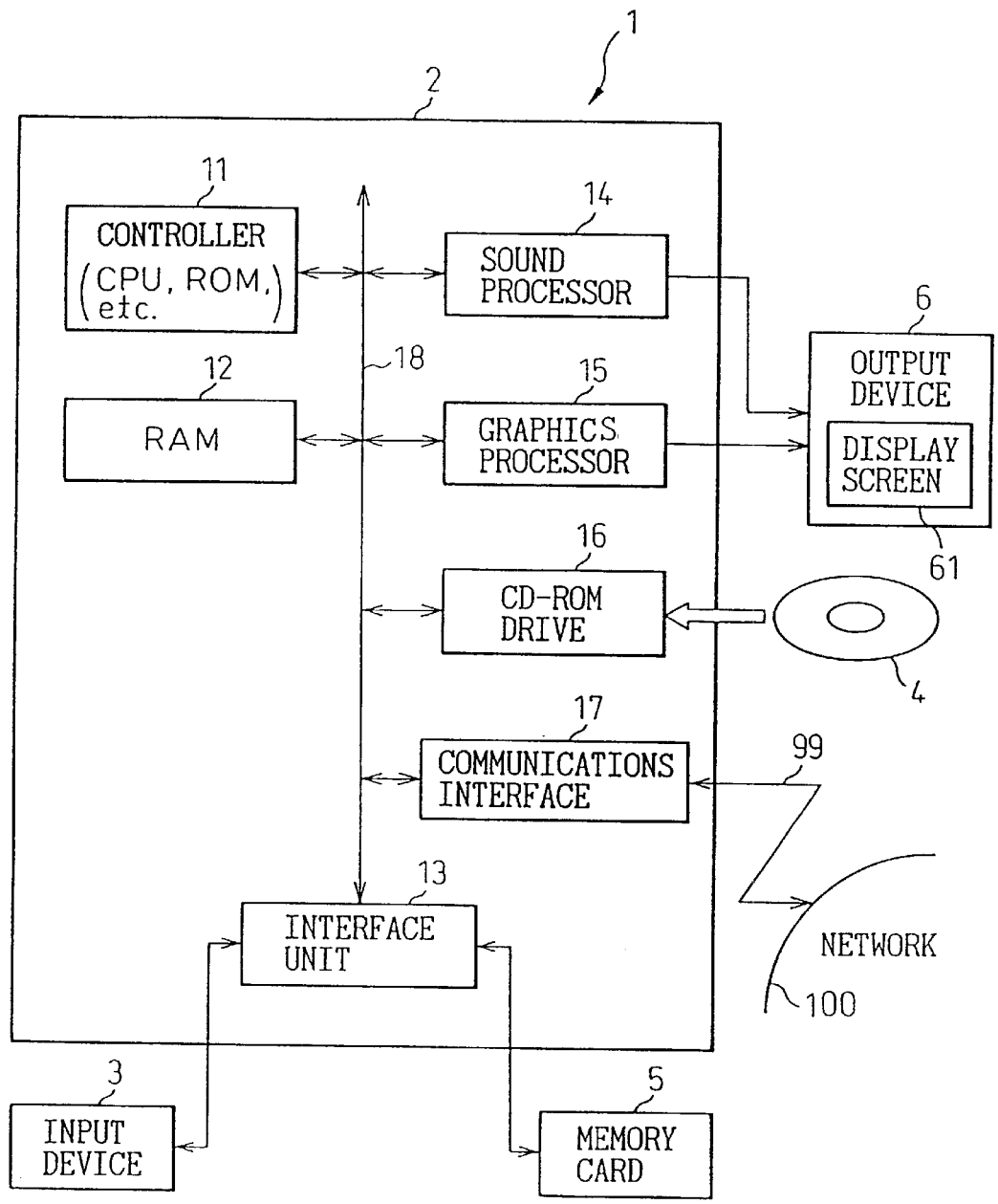
FIG. 1 is a block diagram of the overall configuration of a game system according to an aspect to the present invention.

FIG. 1 is a block diagram of the overall configuration of an example game system to which the image processing technology according to the present invention is applied.

The game system 1 is, roughly speaking, comprised of a console 2 having the main functions of the game system 1, an input device (controller) 3 for inputting operating instructions to the game system unit 2, a memory card 5 for storing the data of the game in progress, the data on the settings of the game environment, and other data to be saved, and an output device 6 for displaying an image or outputting sound in accordance with the content of the game based on a video signal or audio signal from the game system unit 2.

The console 2 for example is provided with a controller 11, random access memory (RAM) 12, interface unit 13, sound processor 14, graphics processor 15, compact disc read only memory (CD-ROM) drive 16, communications interface 17, and bus 18 connecting these components. Further, the CD-ROM drive 16 is configured to be able to be loaded with a program product 4 such as a CD-ROM. The program product 4 stores a program, image data, sound data, etc. for realizing the later explained image processing relating to the game, etc.

The controller 11 is a circuit comprised of a central processing unit (CPU), read only memory (ROM), etc. The CPU controls the parts in accordance with a program stored in the RAM 12 (in some cases, the ROM). The interface unit 13 is configured to be able to be connected to the input device 3 and memory card 5. The interface unit 13 controls the transfer of data between the parts connected to the bus 18 (mainly the controller 11) and the input device 3 or memory card 5.

The sound processor 14 is a circuit having the function of producing background music (BGM) or sound effects for the game. The sound processor 14 generates an audio signal in accordance with commands from the controller 11 based on data stored in the RAM 12, sound data stored in the program product 4, etc. The generated audio signal is output to the output device 6.

The graphics processor 15 is provided with a frame buffer (not shown). The graphics processor 15 draws an image in accordance with commands from the controller 11 on the frame buffer. Further the graphics processor 15 generates a video signal for displaying the image data drawn in the frame buffer. The generated video signal is output to the output device 6. Note that in this specification, writing image data into the frame buffer is referred to as "drawing", while generating a video signal based on the image data written in the frame buffer and displaying an image on the output device is referred to as "displaying" for differentiation between the two.

The CD-ROM drive 16 is a reader for reading data stored in the program product 4, here, the CD-ROM. The game system I makes the controller 11 perform control in accordance with an image processing program and game program stored in the CD-ROM.

By this, control relating to the later explained image processing and game is realized.

The communications interface 17 is a circuit for control of communications when exchanging various data with another apparatus on a network 100. The communications interface 17 is connected to the network 100 through a communications line 99 in accordance with need.

Figure 2:
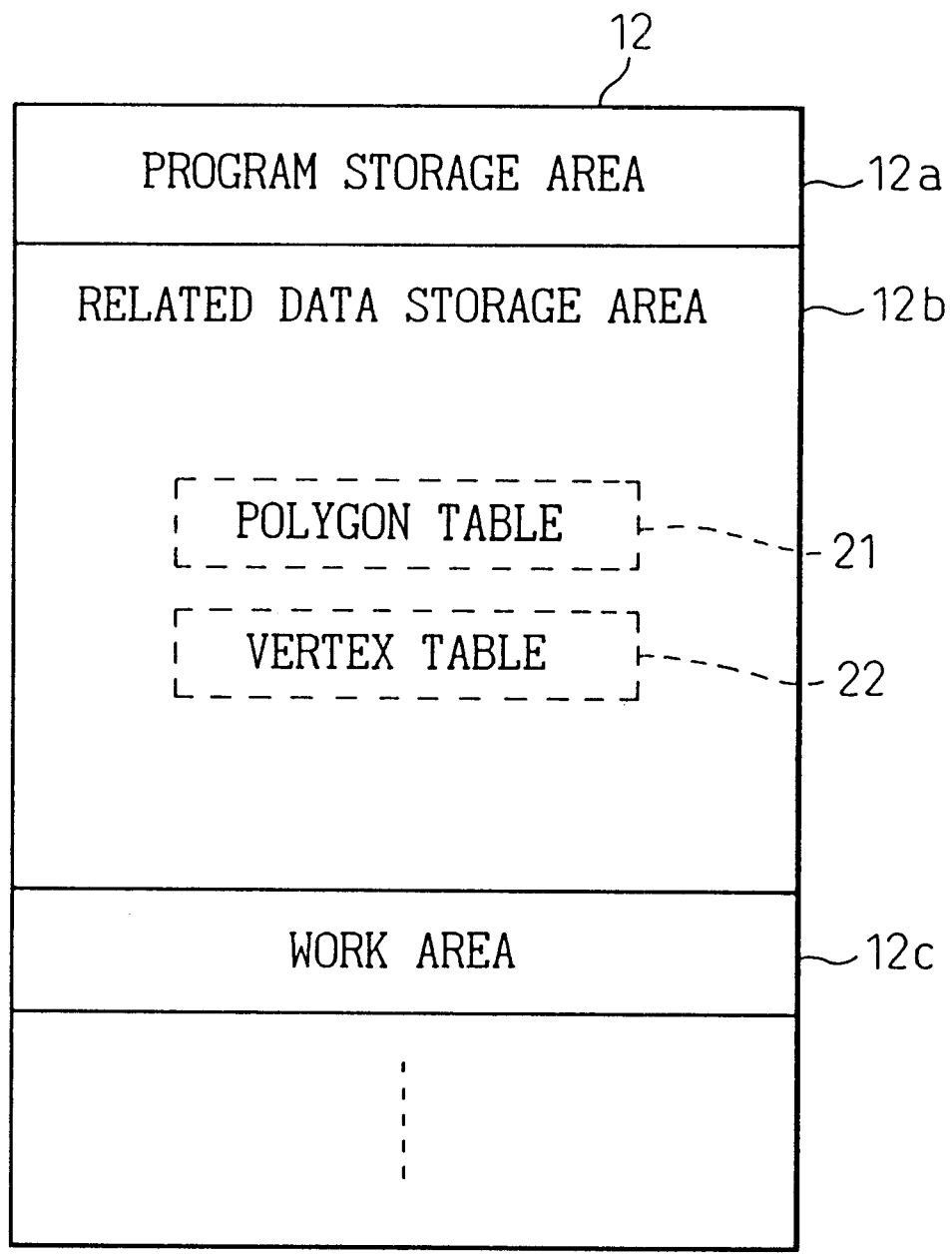
FIG. 2 is a view of a memory configuration of a RAM in a first embodiment.

FIG. 2 is a view of an example memory configuration of the RAM 12 shown in FIG. 1.

The RAM 12 has for example a program storage area 12a, a related data storage area 12b, a work area 12c, etc. The program storage area 12a stores the program to be executed by the controller 11. The related data storage area 12b stores the later explained polygon table 21, vertex table 22, and other data required for execution of the image processing of the three-dimensional object comprised of the polygons.

Here, an explanation will be given of a three-dimensional object comprised of polygons.

Figure 3:
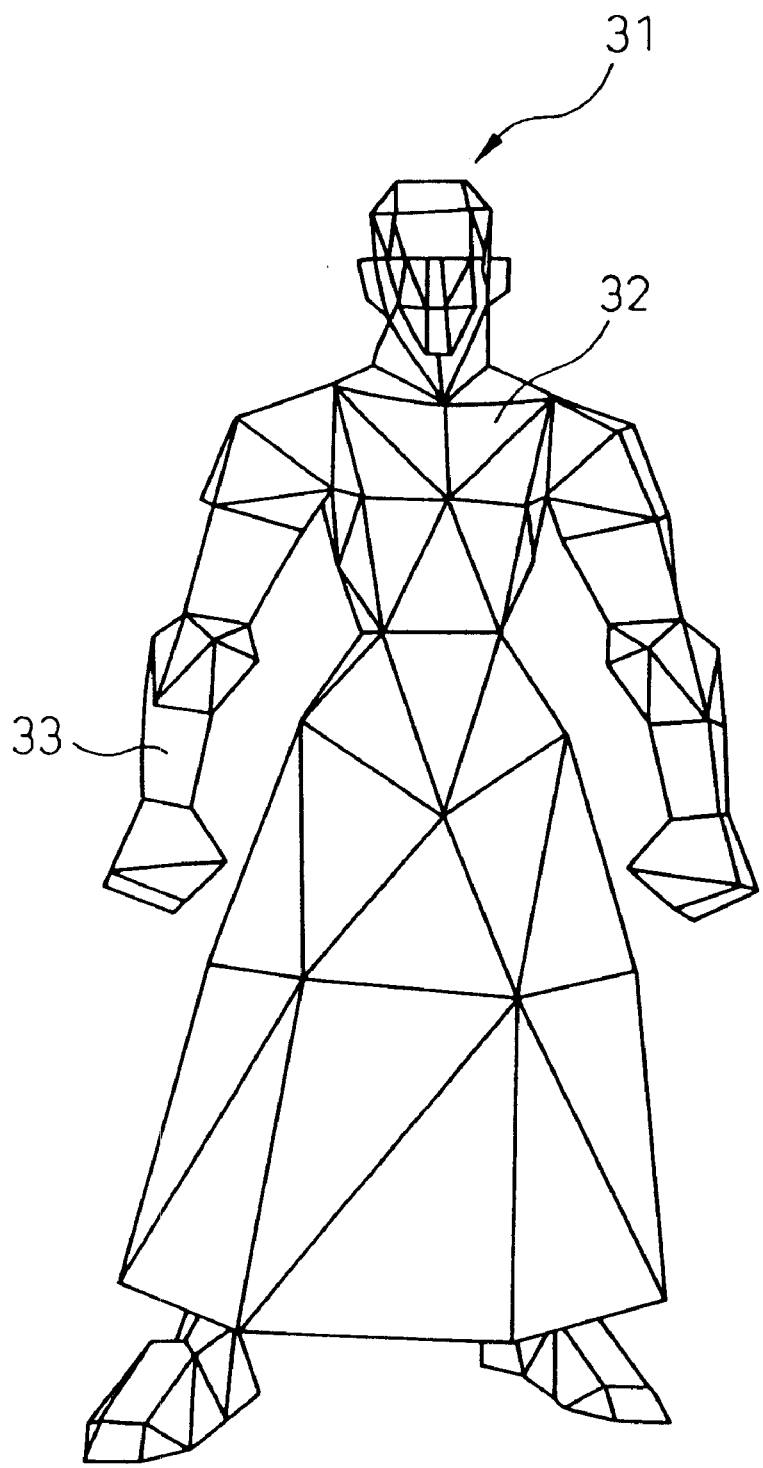
FIG. 3 is a view of an example of a three-dimensional object comprised of polygons.

FIG. 3 is a view of an example of a man-shaped three-dimensional object comprised of polygons.

The three-dimensional object 31 is expressed by a composite of a plurality of polygons 32 and 33 comprising the surface of this three-dimensional shape. The individual polygons 32 and 33 are comprised of polylaterals. For example, the three-dimensional object 31 is comprised by triangular polygons 32 comprised of triangles, quadrilateral polygons 33 comprised of quadrilaterals, etc.

Note that a triangular polygon is defined by three vertexes in the virtual three-dimensional space, to always becomes a plane. A quadrilateral polygon is defined by four vertexes in the virtual three-dimensional space, to sometimes become a plane. That is, depending on the positional relationship of the four vertexes, sometimes it becomes a bent face, i.e., a face other than a plane.

In this specification, a quadrilateral polygon means a polygon defined by four vertexes in a virtual three-dimensional space and includes both planes and non-planar faces.

When the form of the three-dimensional object is in its basic stance, however, the quadrilateral polygons become planes. The "basic stance" of a three-dimensional object means the basic state of the form of the three-dimensional object which sequentially changes in accordance with the state of the game, input operation, etc. For example, it is the state shown in FIG. 3. The later described polygon table 21 and vertex table 22 store data relating to this basic stance.

If the three-dimensional object rotates or twists, the form of the three-dimensional object changes. Due to this, the positional relationship of the four vertexes defining a quadrilateral polygon change and the quadrilateral polygon no longer necessarily becomes a plane. The same applies to a pentalateral or higher polylateral polygon.

When the form of the three-dimensional object changes from the basic stance, the data at the time of the basic stance, that is, the data stored in the later-mentioned polygon table 21 and vertex table 22 and the data for change provided in advance are entered in a predetermined calculation formula. Further, the data for display of the basic stance is sequentially calculated. The calculated data is stored as temporary data in the work area 12c of the RAM 12 and sequentially updated.

The present invention is one which re-divides a quadrilateral polygon, divided into two triangular planes with a straight line connecting two facing vertexes, into two new triangular planes with a straight line connecting the remaining two vertexes when the quadrilateral polygon forms a concave or convex shape about that line. The first embodiment applies this aspect of the invention.

That is, when a quadrilateral polygon divided into two triangular planes forms a concave shape facing the outside of the three-dimensional object, the quadrilateral polygon is re-divided into two separate triangular planes. Due to this, the quadrilateral polygon forms a convex shape facing the outside of the three-dimensional object.

Here, assume that a face formed successively in the clockwise direction by a first vertex, second vertex, third vertex, and fourth vertex in the three-dimensional space is not a plane. Assume that the relationship between the triangular plane formed by the first vertex, second vertex, and third vertex and the triangular plane formed by the first vertex, third vertex, and fourth vertex is that of a concave shape. In this case, it is known that the relationship between the triangular plane formed by the first vertex, second vertex, and fourth vertex and the triangular plane formed by the second vertex, third vertex, and fourth vertex is that of a convex shape.

Figure 5:
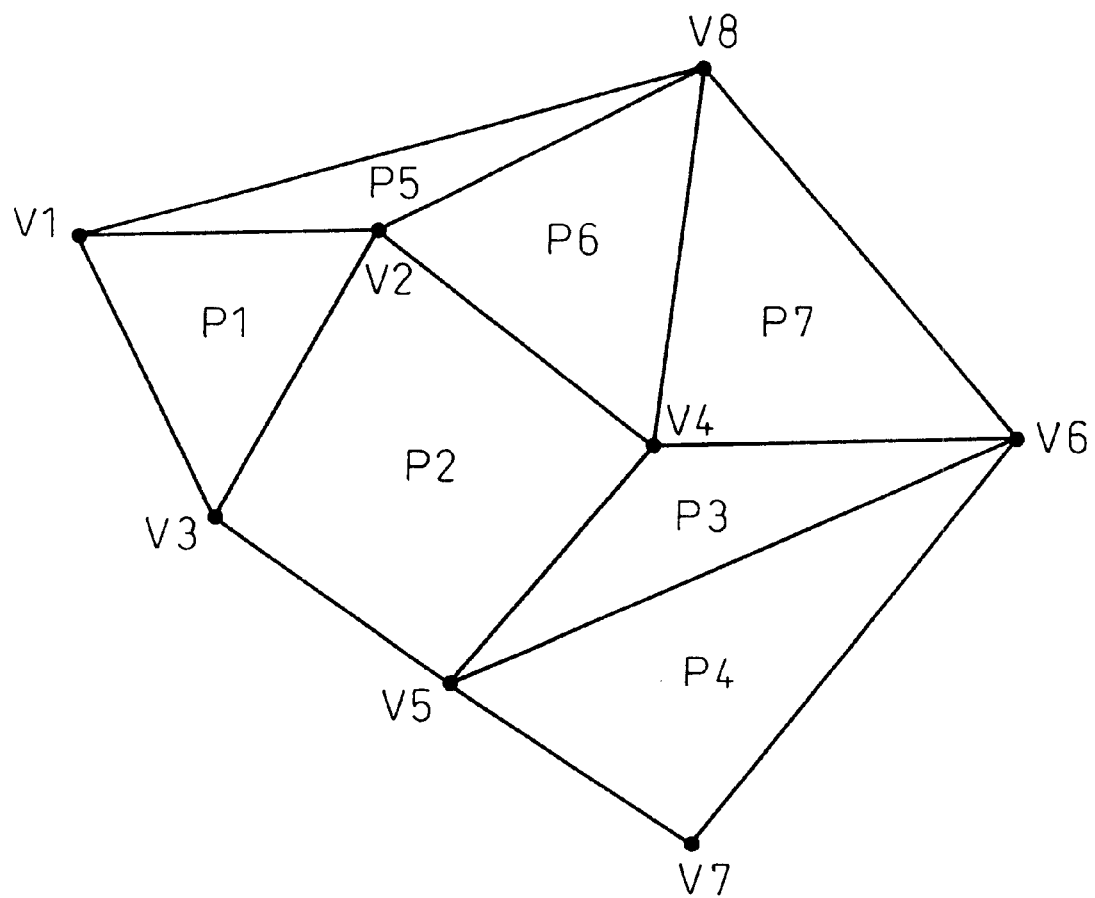
FIG. 5 is a view of polygons for explaining an example of a data structure of a polygon table.

FIG. 4 is a view of a data structure of the polygon table 21. FIG. 5 is a schematic view of polygons comprising the surface of a three-dimensional shape of an object for explaining an example of data stored in the polygon table 21.

The polygon table 21 is a table for storing the polygon data of the polygons comprising the three-dimensional object. The polygon table 21 stores the data of the basic stance of all three-dimensional objects able to be displayed during a game. The stored data is prepared and recorded as shape data of the objects desired to be displayed by the game developers.

The polygon table 21 is configured with for example an "OBJECT ID NO." column 211, "POLYGON ID NO." column 212, "VERTEX ID NO." column 213, and "DIVISION DESIGNATION FLAG" column 214.

The "OBJECT ID NO." column 211 stores numerical data for identifying three-dimensional objects (object ID nos.) The object ID nos. are assigned to each object for display such as a player character or enemy character. The object ID nos. are, in the example shown in FIG. 4, M1 and M2.

The "POLYGON ID NO." column 212 stores numerical data for identifying polygons comprising a three-dimensional object for each three-dimensional object (polygon ID nos.) The polygon ID nos. are, in the example shown in FIG. 4, P1, P2, P3, and P4. Note that the polygons are stored divided into groups for each movable part such as a head, chest, right arm, left arm, waist, right leg, and left leg in the case of a man-shaped three-dimensional object.

The "VERTEX ID NO." column 213 stores numerical data for identifying the vertexes of the polylaterals forming the polygons for each polygon (vertex ID nos.) The vertex ID nos. in the example shown in FIG. 4 are V1, V2, V3 . . . .

For example, as in the example shown in FIG. 5, assume that the polygon P1 in the three-dimensional object M1 is comprised of the vertex V1, vertex V2, and vertex V3. In this case, V1, V2, and V3 are stored in the "VERTEX ID NO." column 213 of the polygon table 21 at the object ID no. M1 and the polygon ID no. P1. Further, in the case where the polygon P2 of the three-dimensional object M1 is comprised of the vertex V3, vertex V2, vertex V5, and vertex V4; V3, V2, V4, and V5 are stored in the corresponding "VERTEX ID NO." column 213 of the polygon table 21.

The "DIVISION DESIGNATION FLAG" column 214 stores the value of "1" or "0 (zero)". A polygon with a value of the division designation flag of "1" is a polygon designated for division. A polygon with a value of the division designation flag of "0" is a polygon not designated for division. The value of the division designation flag is preset by the game developers.

Here, a triangular polygon is not designated for division. The reason is a triangular polygon will always be a plane no matter how the form of the three-dimensional object changes. Therefore, only quadrilateral and higher polylateral polygons are divided. In this embodiment, triangular polygons and quadrilateral polygons are used, so quadrilateral polygons are divided.

Quadrilateral polygons which will always become a plane no matter how the form of the three-dimensional object changes however do not have to be divided. Therefore, the value of the division designation flag is set to "1" only for the quadrilateral polygons to be divided among the quadrilateral polygons.

Figure 6:
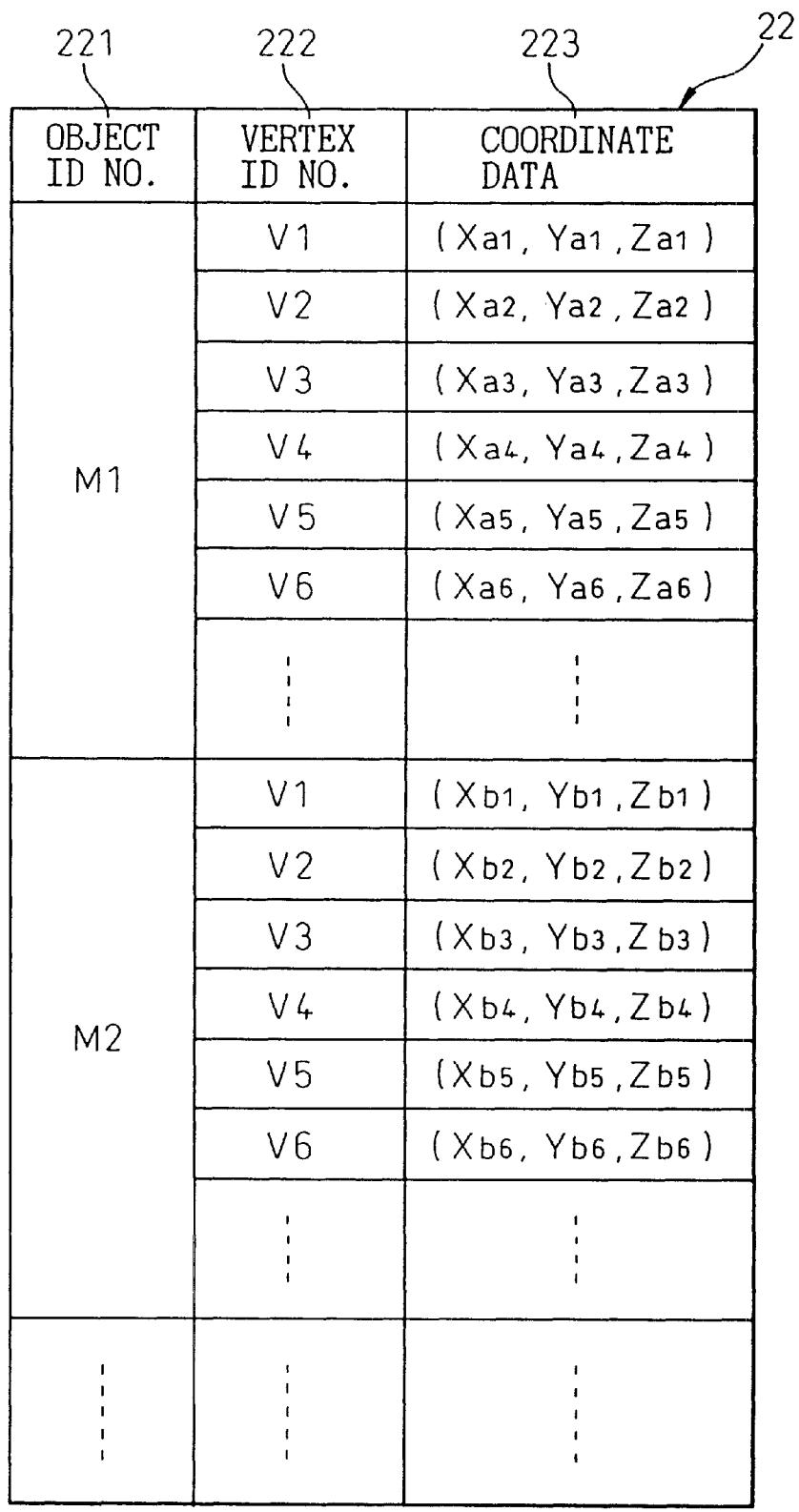
FIG. 6 is a view of an example data structure of a vertex table stored in the RAM shown in FIG. 2.

FIG. 6 is a view of the data structure of the vertex table 22.

The vertex table 22 is a table storing data of all of the vertexes comprising all of the polygons when each three-dimensional object is in its basic stance for every three-dimensional object defined by the polygon table 21. The stored data is prepared and recorded as shape data of objects desired to be displayed by the game developers.

The vertex table 22 is configured for example with an "OBJECT ID NO." column 221, a "VERTEX ID NO." column 222, and a "COORDINATE DATA" column 223. The "OBJECT ID NO." column 221 stores the object ID nos. (in the illustrated example, M1 and M2). The "VERTEX ID NO." column 222 stores the vertex ID nos. (in the illustrated example, V1, V2, V3 . . . )

The "COORDINATE DATA" column 223 stores the coordinate data of the corresponding vertexes in the virtual three-dimensional space (in the illustrated example, (Xa1, Ya1, Za1), (Xa2, Ya2, Za2), etc.) The coordinate data is the data showing the relative positional relationship from reference positional coordinates preset for a three-dimensional object by the game developers or reference positional coordinates preset for every moving part. The coordinate data of the reference positions are stored in the related data storage area 12b of the RAM 12.

When the form of a three-dimensional object changes from the basic stance, the data of the changed stance is calculated by a sequential operation based on the coordinate data stored in the vertex table 22. The calculated data is stored as temporary data in the work area 12c of the RAM 12, and the actual drawing processing is executed based on this temporary data.

When the movement of the three-dimensional object is parallel movement of the three-dimensional object as a whole, the relative positional relationships of the vertexes of the polygons of the portions covered by the movement do not change. Therefore, as the data of the changed stance changes, only the coordinate data of the reference position of the three-dimensional object or the reference position of the moving parts is updated.

When the movement of the three-dimensional object is accompanied by twisting, torsion, elongation, contraction, deformation, etc., however, a change occurs in the relative positional relationships of the vertexes of the polygons of the portions covered by the movement. Therefore, as the data of the changed stance changes, it is necessary to update the coordinate data of the reference position of the three-dimensional object or the reference position of the moving parts and update the coordinate data of the vertexes.

Next, exemplary operation of the game system 1 to which the present invention is applied will be explained in detail.

At startup, the controller 11 reads the program and data necessary for execution of the image processing or game from the program product 4, that is, CD-ROM, through the CD-ROM drive 16 and transfers it to the RAM 12 based on an operating system stored in the built-in ROM. Further, the controller 11 executes the program transferred to the RAM 12 to execute the various processing described below. Note that among the control operations performed by the game system 1, there are operations where circuits other than the controller 11 cooperate with the controller 11 for the actual control. For the convenience of the explanation, below, an explanation will be made assuming that control involving the controller 11 is direct control by the controller 11.

Further, the program and data necessary for execution of the image processing or game are actually successively read out from the program product 4, that is, the CD-ROM, and transferred to the RAM 12 in accordance with the state of progress of the processing according to commands from the controller 11. In the explanation given below, however, to facilitate understanding of the invention, detailed explanations of the read operation of the data from the CD-ROM and transfer to the RAM 12 are omitted.

First, an example overall flow of the image display processing will be explained.

Figure 7:
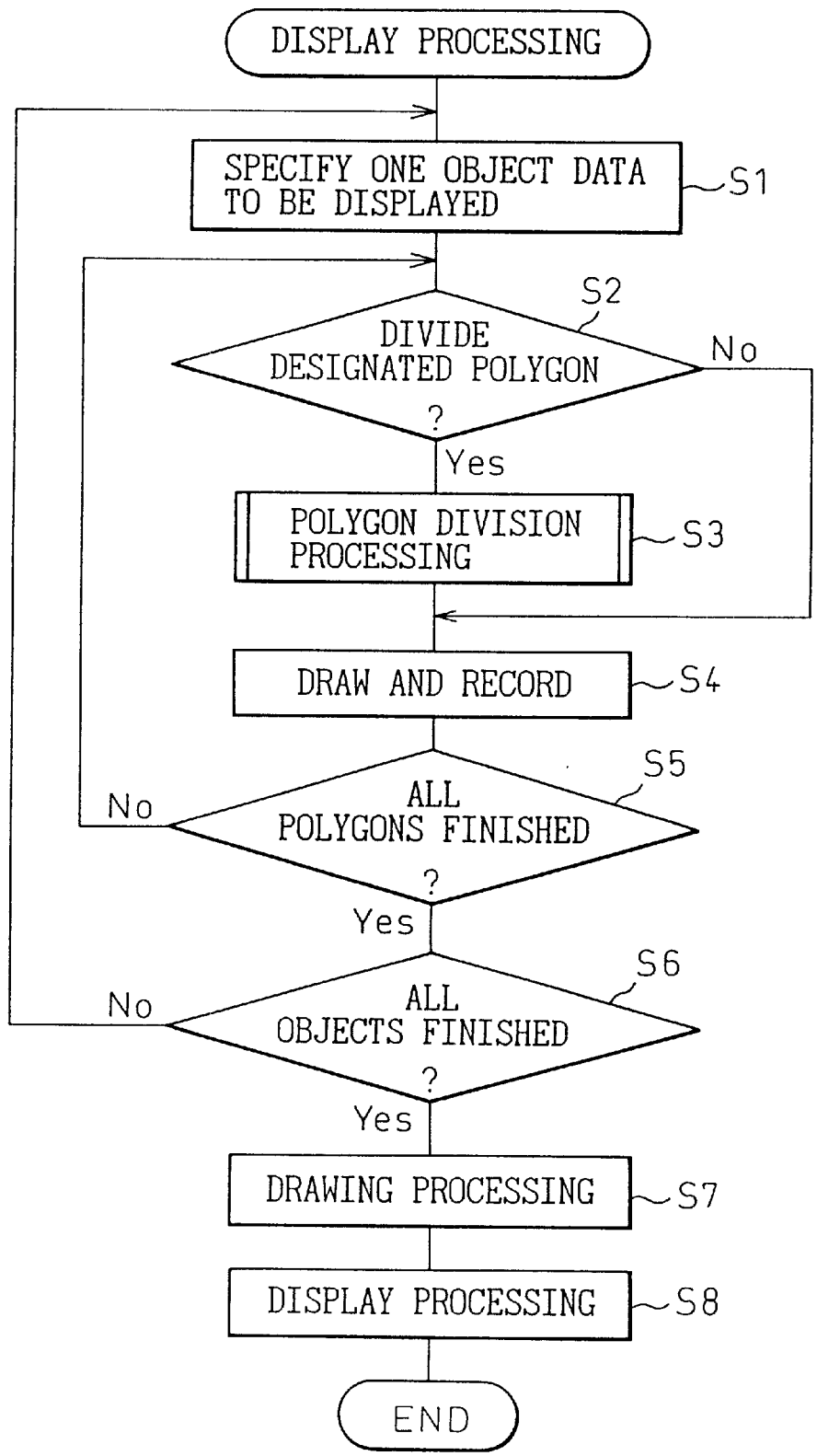
FIG. 7 is a flow chart of display processing of the first embodiment.

FIG. 7 is a flow chart of an example of the display processing.

When the display processing is started, first, all of the three-dimensional objects to be covered by the display are specified. The object ID nos. of the specified three-dimensional objects are stored in the work area 12c of the RAM 12 as temporary data.

Certain object ID nos. are obtained in a predetermined order from among all of the object ID nos. stored in the work area 12c. For example, the order of fetching the object ID nos. is the order from descending ID nos. All of the polygon ID nos. corresponding to the fetched object ID nos. and data of the division designation flag are specified referring to the polygon table 21 (step S1).

Next, certain polygon ID nos. are specified in a predetermined order from among all of the specified polygon ID nos. For example, the order of specifying the polygon ID nos. is the order of the descending ID nos. Further, whether a specified polygon is designated for division is judged based on the value of the division flag corresponding to the specified polygon ID no. (step S2). That is, at step S2, a quadrilateral polygon designated for division is identified from the triangular and higher polylateral polygons comprising a three-dimensional object.

The polygon designated for division is subjected to the subroutine for polygon division processing explained later (step S3), then is drawn and recorded as two triangular polygons (step S4). The polygons not designated for division are drawn and recorded as they are without the division processing (step S4).

Next, the processing of step S2 to step S4 is performed on the polygon with the next smallest number for example among the polygon ID nos. corresponding to the object ID no. fetched at step S1. Similar processing (step S2 to step S4) is repeated in the order of the descending polygon ID nos. until the end of the drawing and recording of step S4 for all of the polygons corresponding to the object ID no. fetched at step S1.

Next, it is judged if the drawing and recording of step S4 has ended for all polygons corresponding to the object ID nos. obtained at step S1 (step S5). If the drawing and recording have ended, similar processing (step S1 to step S5) is performed for the three-dimensional object with for example the next smallest no. among the object ID nos. specified for display at step S1. Similar processing (step S1 to step S4) is repeated in order of for example the descending object ID nos. until the drawing and recording are ended for all three-dimensional objects specified for display at step S1.

When the drawing and recording end for all three-dimensional objects for display (step S6), the perspective transformation image is drawn in the frame buffer based on the drawn and recorded data (step S7). Next, a video signal for display of the image data drawn in the frame buffer is generated. Further, the generated video signal is output to the output device 6 where processing is performed for displaying an image on the display screen 61 of the display 61 (step S8). Then display processing ends.

Next, an explanation will be made of the flow of the polygon division processing.

FIG. 8 is a flow chart of an example of the polygon division processing.

Figure 9A:
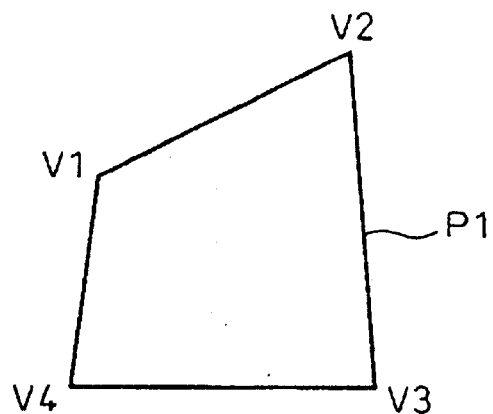
FIG. 9A is a schematic view of an example of a polygon comprising part of the surface of the three-dimensional shape of an object before polygon division.
Figure 9B:
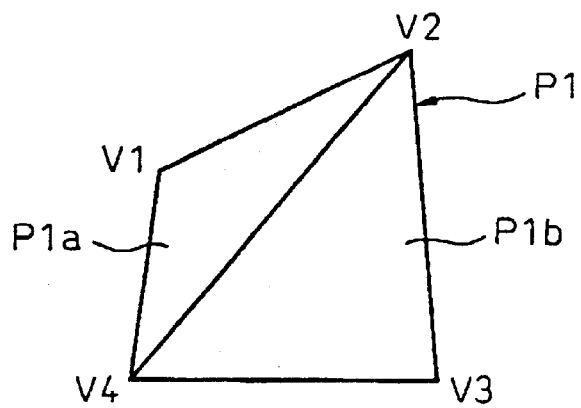
FIG. 9B is a schematic view of an example of a polygon comprising part of the surface of the three-dimensional shape of an object after polygon division.
Figure 9C:
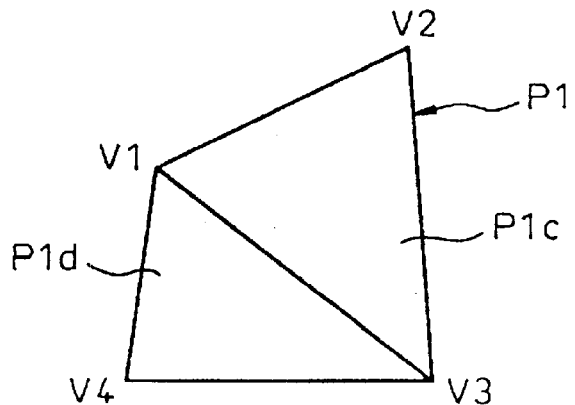
FIG. 9C is a schematic view of an example of a polygon comprising part of the surface of the three-dimensional shape of an object after polygon division.
Figure 10A:
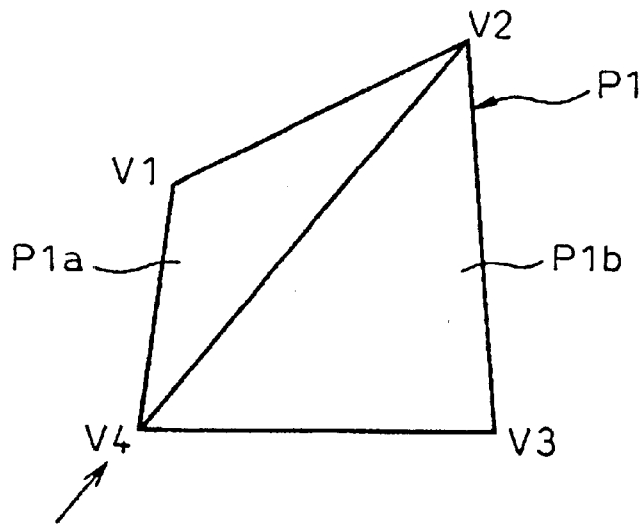
FIG. 10A is a schematic view of an exam.e of polygon division processing.
Figure 10B:
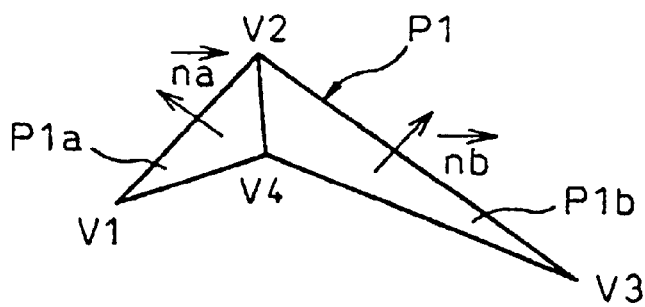
FIG. 10B is a schematic view of an example of polygon division processing.
Figure 10D:
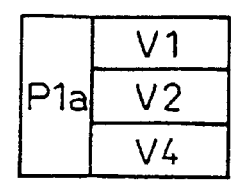
FIG. 10D is a view of an example of storage of data in a polygon table after polygon division processing.
Figure 10C:
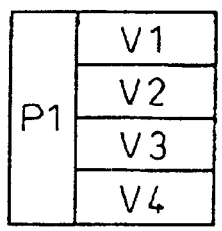
FIG. 10C is a view of an example of storage of data in a polygon table before division processing.
Figure 10E:
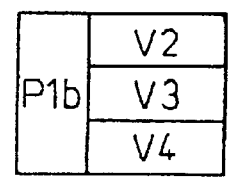
FIG. 10E is a view of an example of storage of data in a polygon table after polygon division processing.

FIG. 9A, FIG. 9B, and FIG. 9C are schematic views of polygons comprising the surface of the three-dimensional shape of an object for explaining the flow of polygon division processing. FIG. 10A and FIG. 10B are schematic views of examples of polygon division processing. FIG. 10C is a view of an example of storage of data in a polygon table before polygon division processing. FIG. 10D and FIG. 10E are views of examples of storage of data in a polygon table after polygon division processing.

When the subroutine of polygon division processing is started, first, the ID nos. of the vertexes comprising a quadrilateral polygon to be divided are obtained from the polygon table 21. Then, the coordinate data corresponding to the vertex ID nos. are obtained from the temporary data of the coordinate data stored in the work area 12c of the RAM 12 (step S31).

Based on the obtained coordinate data of the four vertexes, the quadrilateral polygon is provisionally divided into two triangular planes separated by a straight line connecting one pair of facing vertexes (step S32). For example, consider the case of the quadrilateral polygon P1 defined by the four vertexes V1-V2-V3-V4 as shown in FIG. 9A. Two patterns may be envisioned: a pattern dividing the polygon into two triangular planes P1a and P1b by V2–V4 shown in FIG. 9B and a pattern dividing the polygon into two triangular planes P1c and P1d by V1–V3 shown in FIG. 9C. Among these, any pattern, or one of the patterns in accordance with a predetermined rule, is selected as a provisional division pattern and the provisional division executed.

As a predetermined rule when selecting a provisional division pattern, the following rule may be applied. For example, select a division pattern having as the dividing line the line connecting the vertex with the smallest vertex number and the vertex facing that vertex.

The orientations of the faces of the two triangular planes obtained by the provisional division are then found (step S33). Specifically, the orientations of the faces of the triangular planes are found by performing an external product computation to find the normal vectors for each of the two triangular planes.

Next, the concave/convex relationship of the two triangular planes is judged based on two normal vectors (step S34). If the result of the judgement is that the relationship of the two triangular planes is a convex shape facing the outside of the three-dimensional object (step S35), the quadrilateral polygon is divided into two triangular polygons as in the provisional division pattern (step S36).

On the other hand, if the result of the judgement of the concave/convex relationship is that of a concave shape (step S35), the quadrilateral polygon is divided into two triangular polygons by the other division pattern (step S37). The "other division pattern" means the pattern obtained by connecting by a line the pair of facing vertexes other than the pair of vertexes connected by the line at the time of the provisional division pattern. When the division of the quadrilateral polygon ends at step S36 or step S37, the division processing ends and the routine returns to the display processing shown in FIG. 7.

For example, assume that, as shown in FIG. 10A, the quadrilateral polygon P1 defined by the four vertexes V1-V2-V3-V4 is provisionally divided into a triangular plane P1a defined by the three vertexes V1-V2-V4 and a triangular plane P1b defined by the three vertexes V2-V3-V4. In this case, if, as shown in FIG. 10B, the two triangular planes Pla and P1b are in a relationship of a convex shape facing the outside of the three-dimensional object when viewing the vertex V2 from the vertex V4, the polygon is divided into the two triangular polygons P1a and P1b as is as shown in FIG. 10C, FIG 10D, and FIG 10E.

On the other hand, if the two triangular planes P1a and P1b are in a relationship of a concave shape facing the outside of the three-dimensional object, the polygon is divided into two triangular polygons P1c and P1d by a separate pattern as shown in FIG. 9C. Further, these are designated the two triangular polygons P1c and P1d.

Next, another example of the polygon division processing will be explained.

FIG. 11 is a flow chart of another example of polygon division processing.

When the division processing is started, first, the ID nos. of the vertexes comprising a quadrilateral polygon to be divided are obtained from the polygon table 21. Then, the coordinate data corresponding to the vertex ID nos. are obtained from the temporary data of the coordinate data stored in the work area 12c of the RAM 12 (step S41).

Based on the obtained coordinate data of the four vertexes, the quadrilateral polygon is provisionally divided into two triangular planes separated by a straight line connecting one pair of facing vertexes (step S42). Next, external product computation is used to find the normal vectors for one of the triangular planes among the two triangular planes (step S43).

For example, consider the case, as shown in FIG. 10A, of provisionally dividing the polygon by a line V2–V4 into a triangular plane P1 a defined by the three vertexes V1-V2-V4 and a triangular plane Plb defined by the three vertexes V2-V3-V4. The normal vector (nx, ny, nz) of the triangular plane P1a is found from the following formula (1) to formula (3). The coordinates of the vertex V1, vertex V2, and vertex V4, however, are made (X1, Y1, Z1), (X2, Y2, Z2), and (X4, Y4, Z4).

$$nx=(Y2-Y1)\times(Z4-Z1)-(Z2-Z1)\times(Y4-Y1) \qquad (1)$$

$$ny=(Z2-Z1)\times(X4-X1)-(X2-X1)\times(Z4-Z1) \qquad (2)$$

$$nz=(X2-X1)\times(Y4-Y1)-(Y2-Y1)\times(X4-X1) \qquad (3)$$

Next, the vector of the separating line in the other division pattern different from the provisional division pattern is found (step S44). For example, in the case of the example shown in FIG. 10A, as shown in FIG. 9C, the vector from the vertex V1 to vertex V3 is found. This vector becomes (X3–X1, Y3–Y1, Z3–Z1) if the coordinates of the vertex V1 and vertex V3 are respectively (X1, Y1, Z1) and (X3, Y3, Z3).

Next, the inner product of the normal vector found at step S43 and the vector found at step S44 is calculated (step S45). If this value is "ans", ans is found by the following formula (4):

$$ans=nx\times(X3-X1)+ny\times(Y3-Y1)+nz\times(Z3-Z1) \qquad (4)$$

Further, it is judged if the value of ans found is equal to or more than zero (step S46). When the value of ans is larger than zero, the provisionally divided two triangular planes are in a convex relationship facing the outside of the three-dimensional object. When the value of ans is smaller than zero, the provisionally divided two triangular planes are in a concave relationship facing the outside of the three-dimensional object. When the value of ans is zero, the quadrilateral polygon is a plane.

Therefore, when the value of ans is zero or more, the quadrilateral polygon is divided into the two triangular polygons as in the provisional division pattern (step S47). On the other hand, when the value of ans is smaller than zero, the quadrilateral polygon is divided into two triangular polygons by the other division pattern (step S48). Due to this, when dividing the quadrilateral polygon to be divided into two triangular polygons, the polygon may be divided so that the two triangular polygons become a convex shape or plane facing the outside of the three-dimensional object. When the division of the quadrilateral polygon ends at step S47 or step S48, the division processing ends and the routine returns to the display processing shown in FIG. 7.

The polygon division processing shown in FIG. 11 simplifies the computation step from the polygon division processing shown in FIG. 8, so it is possible to end the division processing at a higher speed. Therefore, the polygon division processing shown in FIG. 11 is particularly effective when there are a large number of polygons comprising the three-dimensional object or when there are a large number of three-dimensional objects to be displayed simultaneously.

According to the first embodiment, when drawing and recording a quadrilateral polygon designated for division among the plurality of polygons comprising a three-dimensional object, the quadrilateral polygon is provisionally divided into two triangular planes. It is judged if these two triangular planes form a convex shape facing the outside of the three-dimensional object.

If the result is that they form a convex shape, the quadrilateral polygon is divided by the provisional division pattern. If concave, the quadrilateral polygon is divided by the other division pattern so that the two triangular planes become convex in shape facing the outside of the three-dimensional object.

Therefore, a quadrilateral polygon designated for division is always divided into two triangular polygons forming a convex shape facing the outside of the three-dimensional object. Due to this, the location displayed by the quadrilateral polygon of the three-dimensional object is displayed to become convex facing the outside, so the three-dimensional object can be displayed more naturally in state. Further, it is possible to display the mode of change of the form of the three-dimensional object without a strange feeling.

Further, according to the first embodiment, the programs of the display processing and polygon division processing are stored in the program product 4, that is, the CD-ROM. Therefore, the program product 4 can be easily distributed and sold separately from the console 2 as a software product. Further, by using a computer or other hardware to use this software, it becomes possible to easily work the image processing technology of the first embodiment by the hardware.

Next, examples of display in the case of applying and the case of not applying the prevention will be illustrated for comparison.

Figure 12D:
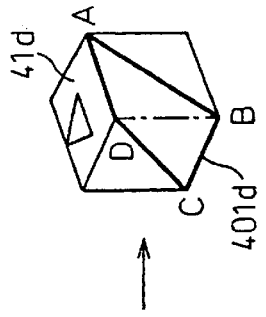
FIG. 12D is a view of an example of a cube corrected for twisting by the first embodiment of the present invention.
Figure 12C:
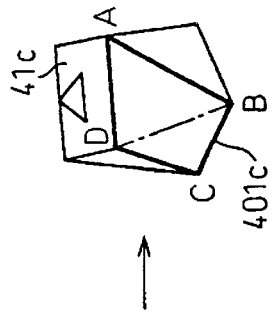
FIG. 12C is a view of an example of a cube corrected for twisting by the first embodiment of the present invention.
Figure 12B:
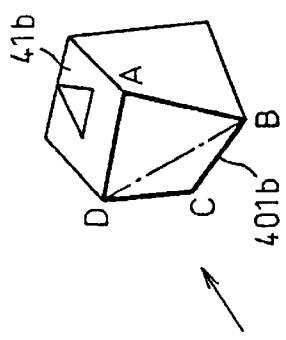
FIG. 12B is a view of an example of a cube corrected for twisting by the first embodiment of the present invention.
Figure 12G:
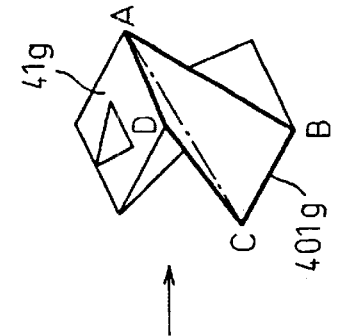
FIG. 12G is a view of an example of a cube to which the first embodiment of the present invention is not applied.
Figure 12F:
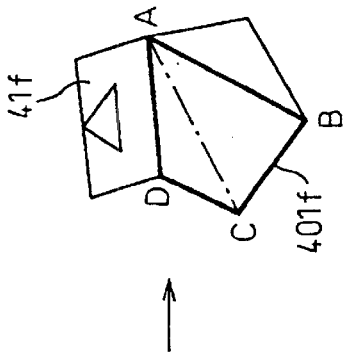
FIG. 12F is a view of an example of a cube to which the first embodiment of the present invention is not applied.
Figure 12E:
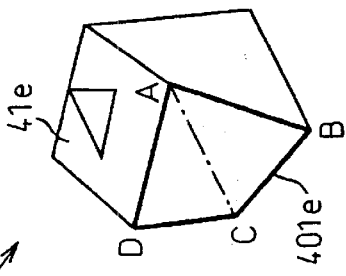
FIG. 12E is a view of an example of a cube to which the first embodiment of the present invention is not applied.
Figure 12A:
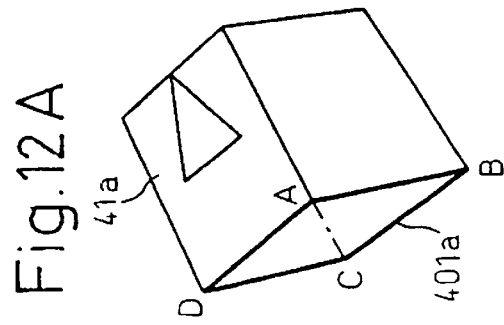
FIG. 12A is a view of an untwisted cube.

FIG. 12A is a view of an untwisted cube; FIG. 12B to FIG. 12D are views of examples of cubes corrected for twisting by the first embodiment of the present invention; and FIG. 12E to FIG. 12G are views of examples of cubes to which the first embodiment of the present invention is not applied.

As shown in FIG. 12A, assume that the quadrilateral polygon 401a comprising one face of the cube 41 a in the original state is provisionally divided into a triangular polygon ABC and triangular polygon ACD separated by the separating line (shown by dotted line) connecting the vertex A and the vertex C.

In the example of application of the present invention, when twisted in the order of FIG. 12B, FIG. 12C, and FIG. 12D from the state of FIG. 12A, the quadrilateral polygon 401b, 401c, 401d is re-divided to the two triangular polygon ABD and triangular polygon BCD separated by the separating line (shown by dotted line) connecting the vertex B and vertex D. Due to this, the triangular polygon ABD and the triangular polygon BCD are bent to become convex facing the outside. In the state of FIG. 12D twisted 90 degrees, the cube 41d is displayed without a strange feeling.

As opposed to this, in the example where the present invention is not applied, the quadrilateral polygon 401e, 401f, 401g is twisted as divided into the provisionally divided triangular polygon ABC and triangular polygon ACD. Therefore, the triangular polygon ABC and triangular polygon ACD formed spanning the separating line AC are bent to become concave facing the outside. In the state of FIG. 12F twisted 45 degrees from the original state and the state of FIG. 12G twisted 90 degrees, the cube 41f, 41g is displayed extremely unnaturally.

Figure 14:
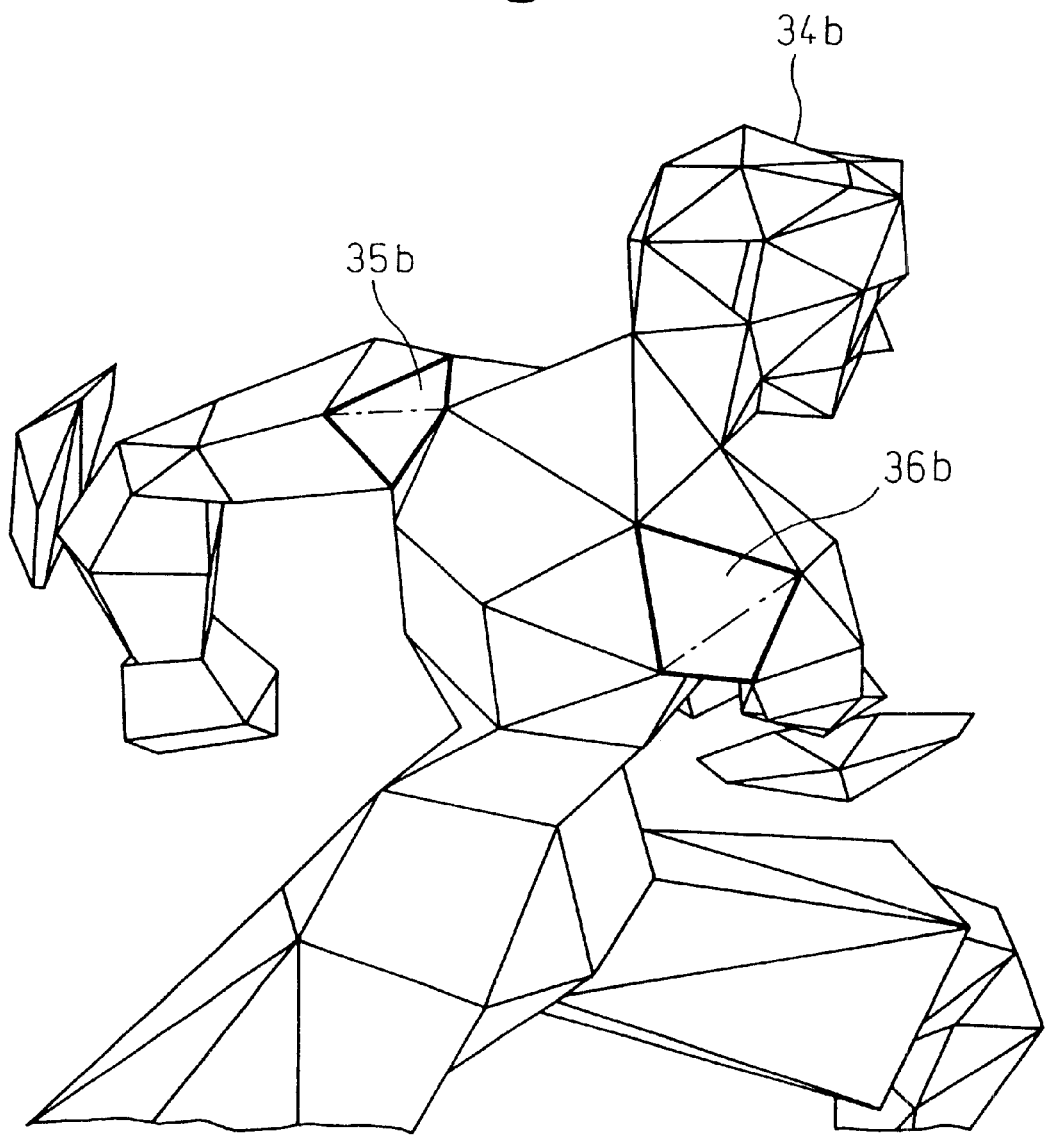
FIG. 14 is a schematic view of a wire frame model showing the state of division of the quadrilateral polygon in a man-shaped three-dimensional object.
Figure 15:
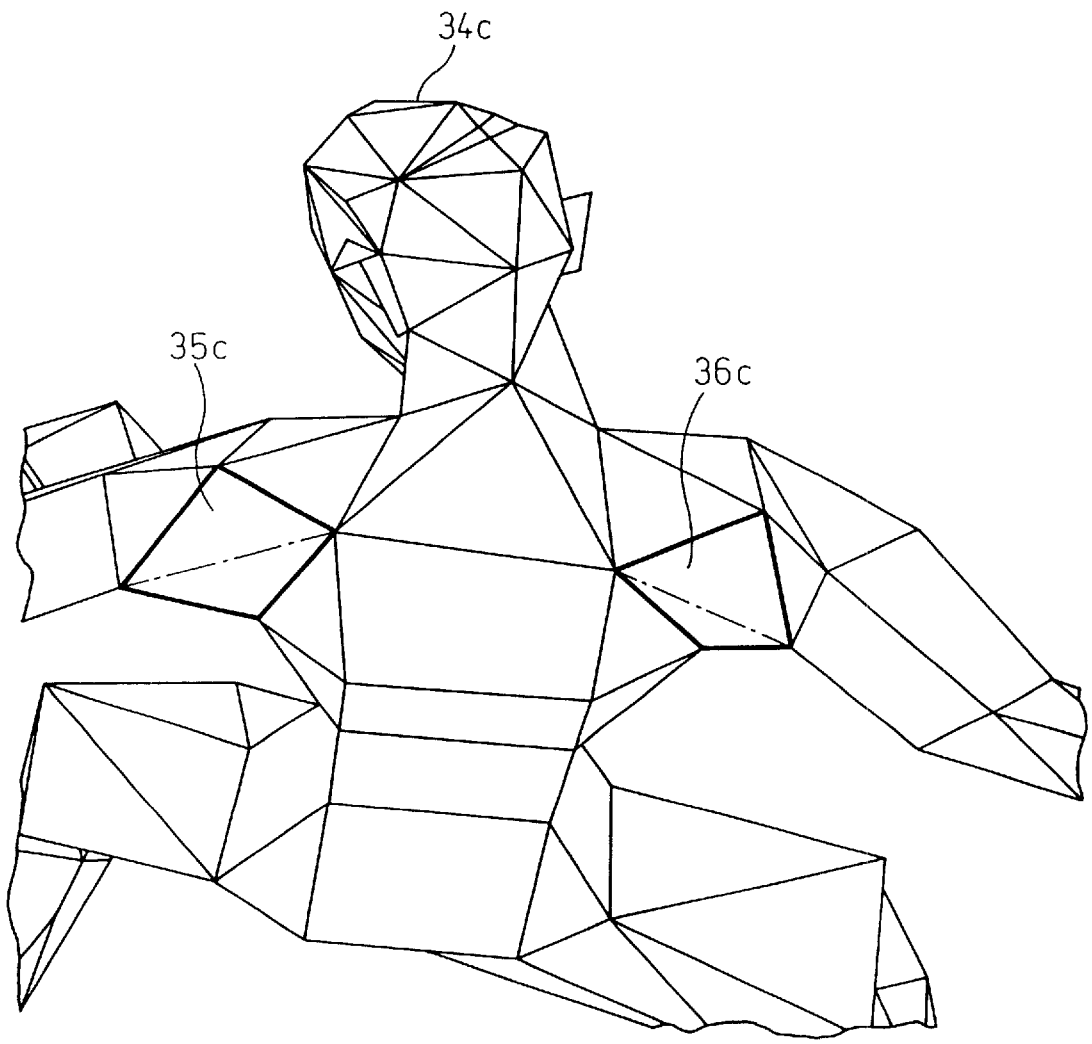
FIG. 15 is a schematic view of a wire frame model showing the state of division of the quadrilateral polygon in a man-shaped three-dimensional object.

FIG. 13, FIG. 14, and FIG. 15 are schematic views of wire frame models showing the state of division of quadrilateral polygons in man-shaped three-dimensional objects 34a, 34b, and 34c.

As shown in these figures, for example, assume that at both the left and right sides of a three-dimensional object 34a (34b, 34c), a location on the back from the shoulder to the armpit is comprised by a single quadrilateral polygon 35a, 36a (35b, 36b, 35c, 36c). Normally, the location on the back from the shoulder to the armpit forms a convex shape facing the outside.

Therefore, even if the three-dimensional object 34a (34b, 34c) moves its arm or twists its body, the quadrilateral polygon 35a or 36a (35b, 36b, 35c, 36c) would appear natural if divided into two triangular polygons so as to become convex in shape across the separating line shown by the dotted line in FIG. 13, FIG. 14, and FIG. 15. That is, the three-dimensional object 34a (34b, 34c) would be displayed in a state without any strange feeling. Based on this, the first embodiment was designed to divide the quadrilateral polygon designated for division into two triangular polygons so that it always becomes convex in shape facing the outside of the three-dimensional object.

Figure 16:
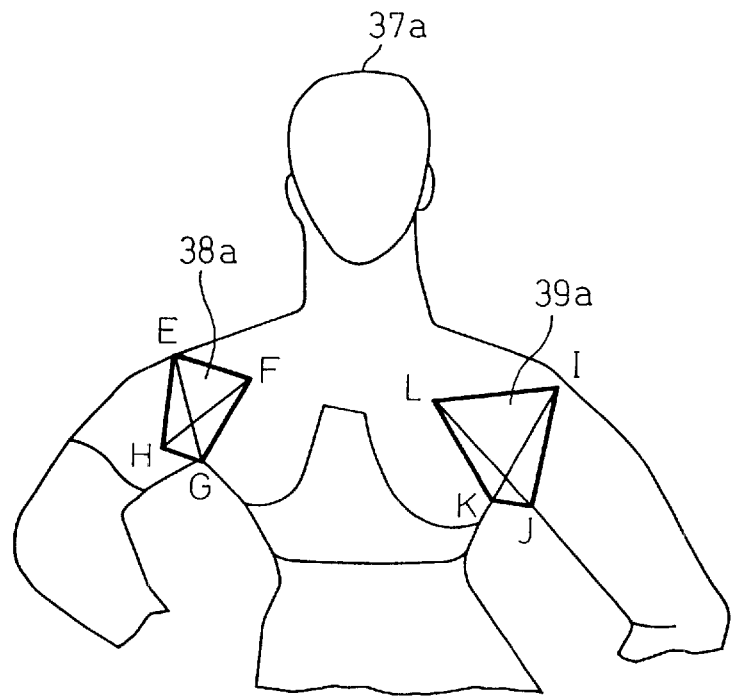
FIG. 16 is a view of the state of a quadrilateral polygon in a specific example of display of a man-shaped three-dimensional object.
Figure 17:
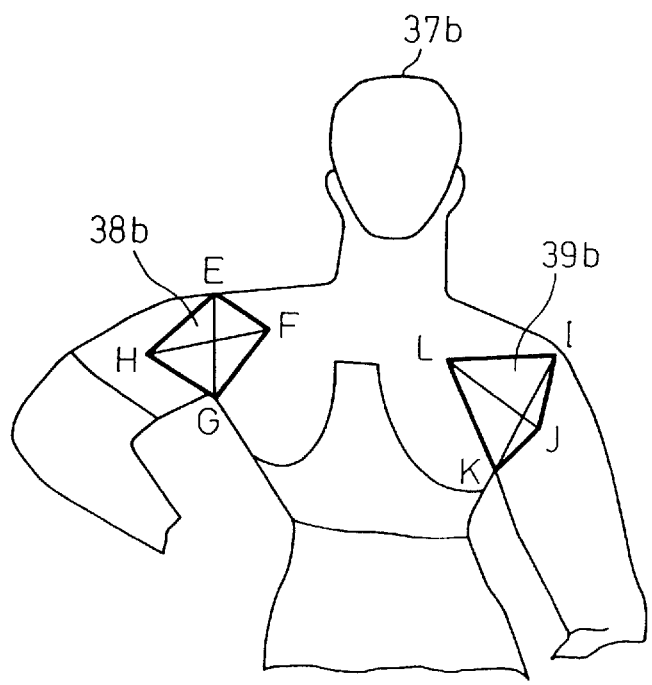
FIG. 17 is a view of the state of a quadrilateral polygon in a specific example of display of a man-shaped three-dimensional object.

FIG. 16 and FIG. 17 are views of the states of quadrilateral polygons in specific examples of display of man-shaped three-dimensional objects 37a, 37b.

For example, when displaying the three-dimensional objects 37a and 37b of the forms shown in FIG. 16 or FIG. 17, the quadrilateral polygons 38a and 38b at the back from the left shoulder to the armpit form convex shapes when divided by the separating line connecting the vertex F and vertex H. Further, they form concave shapes when divided by the separating line connecting the vertex E and vertex G. Due to the relation with the position of the view point, not that much of a strange feeling is produced at the time of display, no matter which way they are divided.

Further, the quadrilateral polygons 39a and 39b at the back from the right shoulder to the armpit form convex shapes when divided by the separating line connecting the vertex L and vertex J. Further, they form concave shapes when divided by the separating line connecting the vertex I and vertex J. Due to the relation with the position of the visual point, not that much of a strange feeling is produced at the time of display, no matter which way they are divided.

FIG. 18A, FIG. 18B, FIG. 19A, and FIG. 19B are views for explaining a comparison of the case of applying and the case of not applying the present invention to the same three-dimensional objects 37c, 37d, 37e, and 37f shown in FIG. 16 and FIG. 17.

Figure 18A:
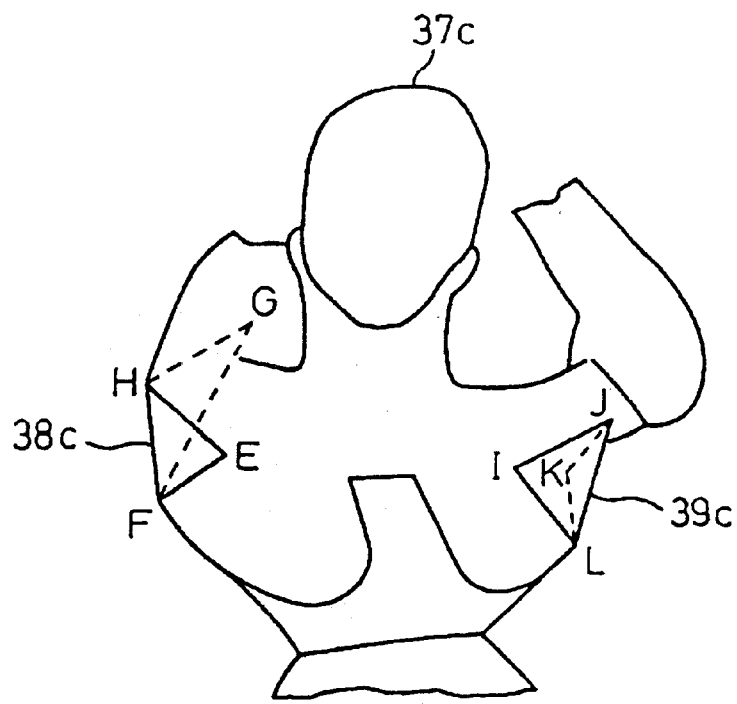
FIG. 18A is a view schematically showing an example of a man-shaped three-dimensional object in the case of applying the first embodiment of the present invention.
Figure 18B:
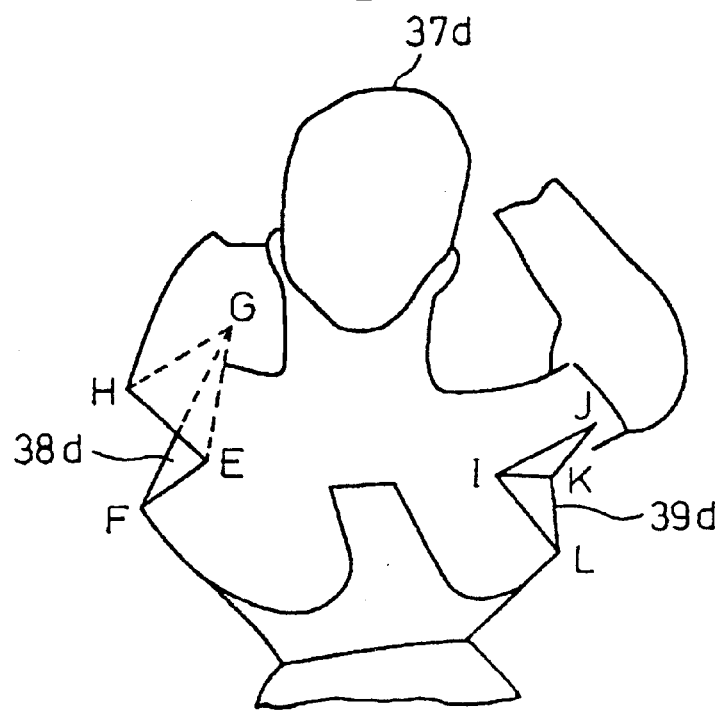
FIG. 18B is a view schematically showing an example of a man-shaped three-dimensional object in the case of not applying the first embodiment of the present invention.
Figure 19A:
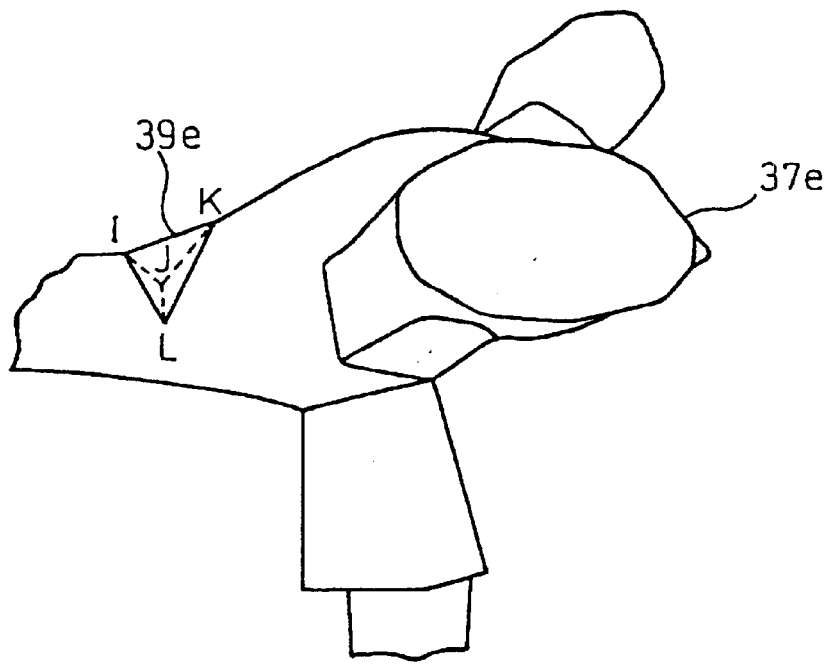
FIG. 19A is a view schematically showing an example of a man-shaped three-dimensional object in the case of applying the first embodiment of the present invention.
Figure 19B:
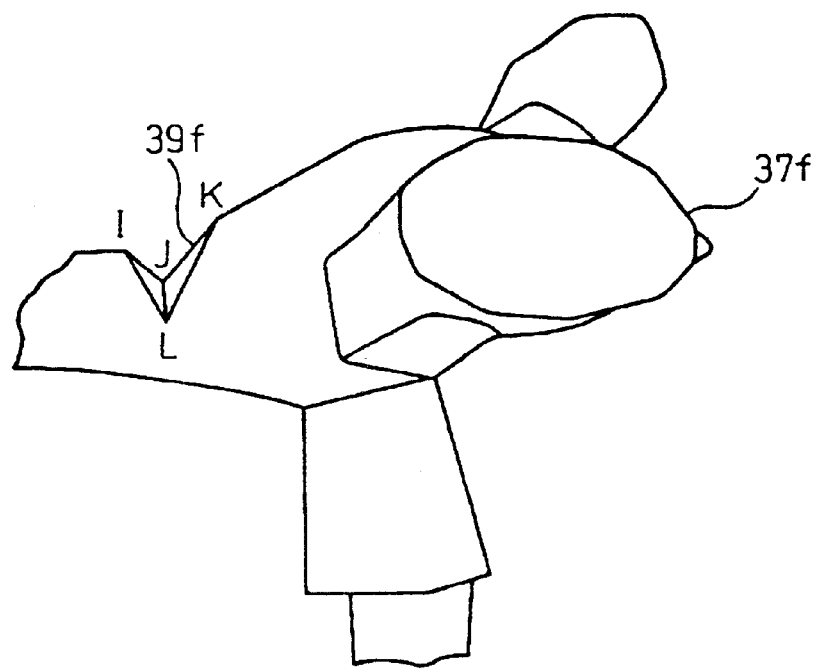
FIG. 19B is a view schematically showing an example of a man-shaped three-dimensional object in the case of not applying the first embodiment of the present invention.

FIG. 18A, and FIG. 18B show the case where the position of the view point is up from the rear of the character, while FIG. 19A, and FIG. 19B show the case where the position of the view point is directly above the character.

The following will be understood from a comparison of FIG. 18A and FIG. 18B. That is, in the case of the display mode shown in FIG. 18A and FIG. 18B, the quadrilateral polygons 38c and 38d at the back from the left shoulder to the armpit preferably are divided by a separating line connecting the vertex F and vertex H. Further, the quadrilateral polygons 39c and 39d at the back from the right shoulder to the armpit are preferably divided by the separating line connecting the vertex J and vertex L. That is, FIG. 18A is suitable as a display mode. On the other hand, in the case shown by FIG.19A and FIG. 19B, the quadrilateral polygons 39e and 39f are preferably divided by the separating line connecting the vertex I and vertex K. That is, FIG. 19A is suitable as a display mode. Note that in FIG. 19A and FIG. 19B, the left shoulder quadrilateral polygon is not visible.

As shown in FIG. 18A, FIG. 18B, FIG. 19A, and FIG. 19B, the following is important for displaying the three-dimensional objects 37c, 37d, 37e, and 37f without a strange feeling. That is, even with the same quadrilateral polygons 39c, 39d, 39e, and 39f, the separating line for dividing the polygons into two triangular polygons in accordance with changes of the form of the three-dimensional objects 37c, 37d, 37e, and 37f is made different.

When applying the present invention, the separating line changes in accordance with the form of the three-dimensional objects 37c, 37d, 37e, 37f so that the quadrilateral polygons form convex shapes facing the outside. Therefore, the three-dimensional objects 37c, 37d, 37e, 37f are always displayed without any strange feeling.

As opposed to this, when not applying the present invention, assuming for example that the quadrilateral polygons 39c, 39d, 39e, 39f are divided by a separating line connecting the vertex I and vertex K at all times, the quadrilateral polygon 39a ends up concave in shape facing the outside in the case of the form shown in FIG. 18B, so the display of the three-dimensional object 37d becomes unnatural.

Alternatively, even if the quadrilateral polygons 39c, 39d, 39e, 39f are divided by a separating line connecting the vertex J and vertex L at all times, the quadrilateral polygon 39f will end up become concave in shape facing the outside in the case of the form shown in FIG. 19(b). Therefore, the display of the three-dimensional object 37f will become unnatural. The same applies to the polygons 38c and 38d.

As clear from the explanation of the above comparison, by applying the present invention, it is possible to display a three-dimensional object in accordance with its form without a strange feeling. That is, by identifying the concave/convex shape of a quadrilateral polygon comprising a three-dimensional object and changing a concave shape to a convex shape, it is possible to correct a part which should inherently not be missing in a contour of a three-dimensional object (character) after perspective transformation.

Note that in the first embodiment, the explanation was made of dividing a quadrilateral polygon designated for division into two triangular polygons, but the invention is not limited to this. It may also be similarly applied to quadrilateral and higher polylateral polygons.

Further, the first embodiment was configured to designate a polygon for division by a division designation flag in advance. The invention is not however limited to this. It may also be configured to not provide data of a division designation flag in the polygon table, but to count the number of vertexes of a polygon to be drawn in the drawing processing and divide it if the number of vertexes is 4 or more.

Further, in the first embodiment, the explanation was made with reference to image display processing in a video game, but the invention is not limited to this. It may also be applied to various other image display processing other than games.

Second Embodiment

Next, a second embodiment of the present invention will be explained. The second embodiment differs from the first embodiment in the following point. That is, the first embodiment divided a quadrilateral polygon to always give a convex shape facing the outside of the three-dimensional object. As opposed to this, the second embodiment provides corresponding division designation information indicating to divide a quadrilateral polygon to give a convex shape facing the outside of the three-dimensional object or divide the quadrilateral polygon to give a concave shape. Further, the quadrilateral polygon is divided based on this division designation information.

For example, dividing a quadrilateral polygon to give a concave shape facing the outside of the three-dimensional object enables display of the display mode of a three-dimensional object without a strange feeling when the three-dimensional object is the location under the armpit of a man shape. That is, a quadrilateral polygon comprising part of a concave surface of a three-dimensional object is better divided to give a concave shape.

Therefore, in the second embodiment, the memory configuration of the RAM 12 differs from that of the first embodiment. Further, in the second embodiment, the polygon division processing differs from that in the first embodiment. The rest of the configuration is the same as the first embodiment. Further, the hardware configuration of the game system 1 and the vertex table 22 are the same as in the first embodiment. Further, the display processing is the same as in the first embodiment. The parts of the configuration and processing the same as in the first embodiment are given the same reference numerals as in the first embodiment and overlapping explanations are omitted. Below, only the points different from the first embodiment will be explained.

Figure 20:
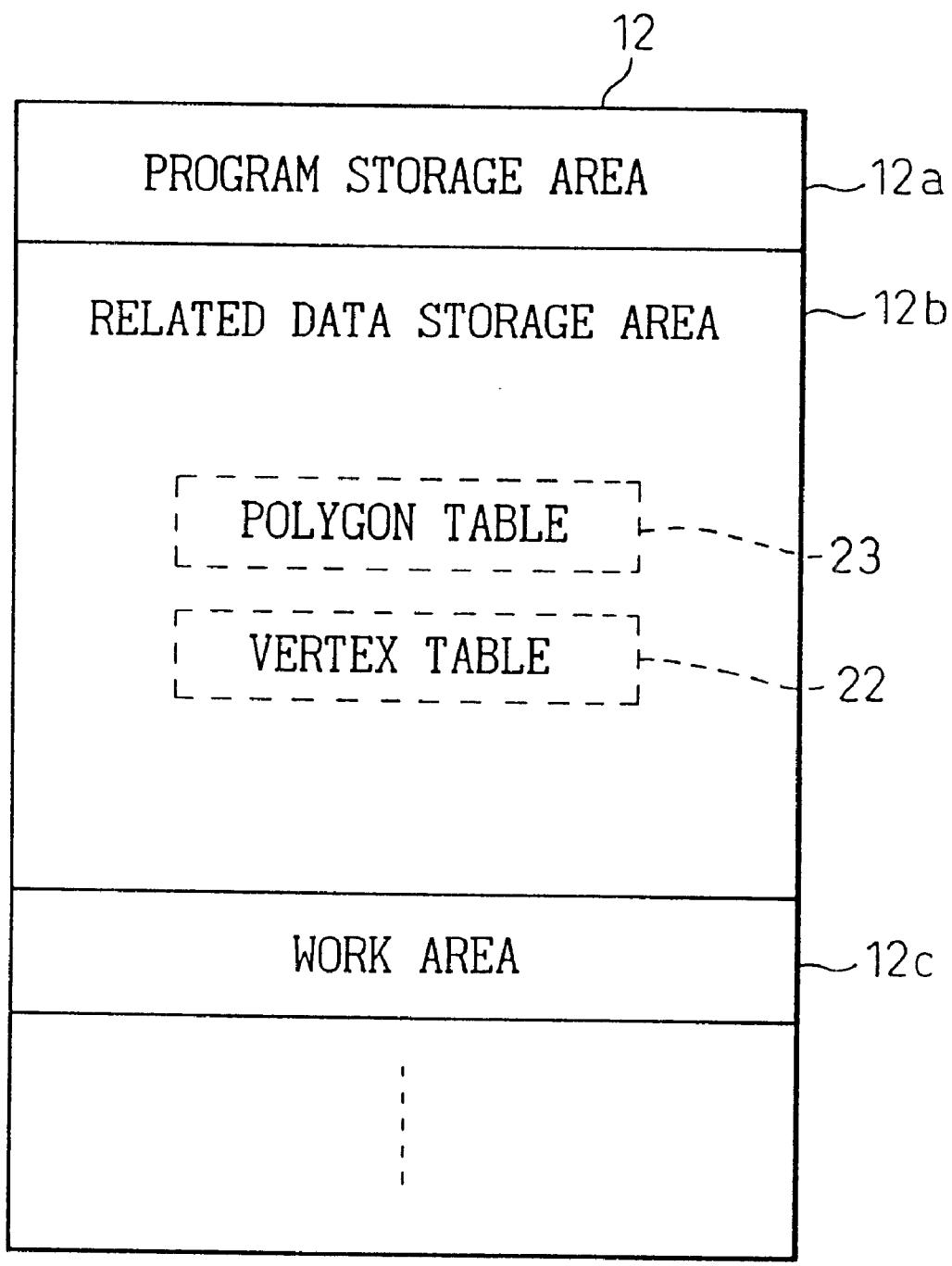
FIG. 20 is a view of an example memory configuration of the RAM in the second embodiment.

FIG. 20 is a view of the memory configuration of the RAM 12 in the second embodiment. The related data storage area 12b of the RAM 12 stores a polygon table 23 different in configuration from the polygon table 21 of the first embodiment.

FIG. 21 is a view of the data structure of a polygon table 23 in the second embodiment. The polygon table 23 is configured with for example an "OBJECT ID NO." column 231, "POLYGON ID NO." column 232, "VERTEX ID NO." column 233, "DIVISION DESIGNATION FLAG" column 234, and "DIVISION TYPE" column 235.

The "OBJECT ID NO." column 231, "POLYGON ID NO." column 232, "VERTEX ID NO." column 233, and "DIVISION DESIGNATION FLAG" column 234 are the same as the "OBJECT ID NO." column 211, "POLYGON ID NO." column 212, "VERTEX ID NO." column 213, and "DIVISION DESIGNATION FLAG" column 214 of the first embodiment, so explanations are omitted.

The "DIVISION TYPE" column 235 stores the division type data of "1" or "0 (zero)". The division type data is data for instructing, at the time of dividing a quadrilateral polygon designated for division, whether to divide it to give a concave shape facing the outside of the three-dimensional object or divide it to give a convex shape. For example, when the value of the division type data is "0 (zero)", it is divided to give a convex shape, while when it is "1", it is divided to give a concave shape. The value of the division type data is preset by the game developers.

Next, the operation of the game system 1 according to the second embodiment will be explained in detail.

At startup, the controller 11 reads the program and data necessary for execution of the image processing or game from the program product 4, that is, CD-ROM, through the CD-ROM drive 16 and transfers it to the RAM 12 based on an operating system stored in the built-in ROM. Further, the controller 11 executes the program transferred to the RAM 12 to execute the various processing described below. Note that among the control operations performed by the game system 1, there are operations where circuits other than the controller 11 cooperate with the controller 11 for the actual control. For the convenience of the explanation, below, an explanation will be made assuming that control involving the controller 11 is direct control by the controller 11.

Further, the program and data necessary for execution of the image processing or game are actually successively read out from the program product 4, that is, the CD-ROM, and transferred to the RAM 12 in accordance with the state of progress of the processing according to commands from the controller 11. In the explanation given below, however, to facilitate understanding of the invention, detailed explanations of the read operation of the data from the CD-ROM and transfer to the RAM 12 are omitted.

The display processing is the same as in the first embodiment, so the explanation thereof will be omitted. Below, the flow of the polygon division processing will be explained.

Figure 22:
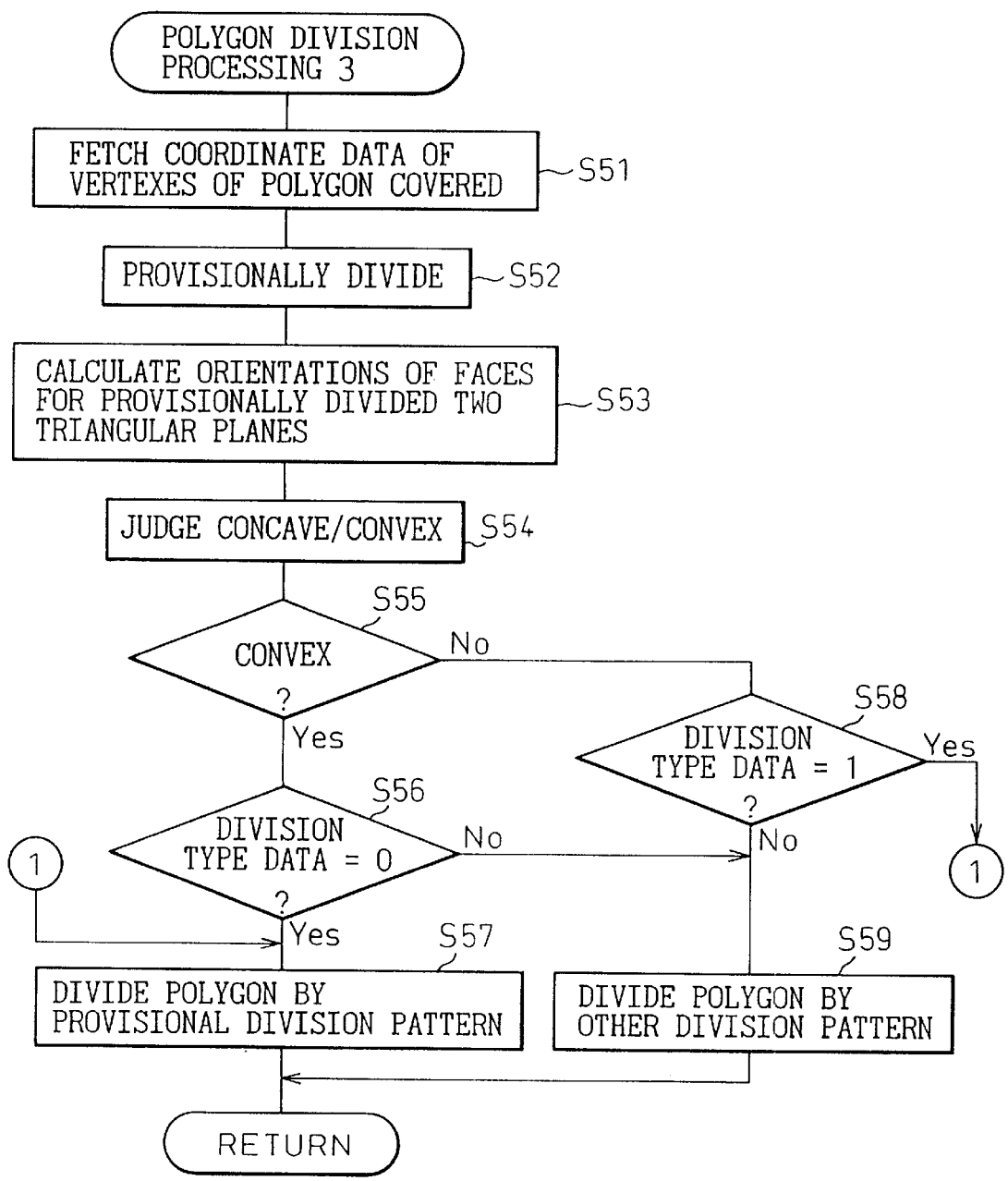
FIG. 22 is a flow chart of the polygon division processing of a second embodiment.

FIG. 22 is a flow chart of an example of the polygon division processing.

When the subroutine of polygon division processing is started, first, the ID nos. of the vertexes comprising a quadrilateral polygon to be divided are obtained from the polygon table 23. Then, the coordinate data corresponding to the vertex ID nos. are obtained from the temporary data of the coordinate data stored in the work area 12c of the RAM 12 (step S51).

Based on the obtained coordinate data of the four vertexes, the quadrilateral polygon is provisionally divided into two triangular planes separated by a straight line connecting one pair of facing vertexes (step S52). Next, the orientations of the faces of the two triangular planes obtained by the provisional division are found (step S53). Specifically, the orientations of the faces of the triangular planes are found by performing an external product computation to find the normal vectors for each of the two triangular planes.

Next, the-concave/convex relationship of the two triangular planes is judged based on two normal vectors (step S54). If the result of the judgement is that the relationship of the two triangular planes is a convex shape facing the outside of the three-dimensional object (step S55), the polygon table 23 is referred to. Further, it is judged if the value of the corresponding division type data is "0" (step S56). If the value of the division type data is "0", division is designated to give a convex shape, so the quadrilateral polygon is divided into two triangular polygons as in the provisional division pattern (step S57).

On the other hand, if the result of the judgement of the concave/convex relationship of step S54 is that the relationship of the two triangular planes is of a concave shape (step S55), the polygon table 23 is referred to. Further, it is judged if the value of the corresponding division type data is "1" (step S58). If the value of the division type data is "1", division is designated to give a concave shape, so the routine proceeds to step S57, where the quadrilateral polygon is divided into two triangular polygons as in the provisional division pattern.

When the result of judgement of the value of the division type data at step S56 is that the value of the division type data is not "0", that is, it is "1", the division is designated to give a concave shape. Therefore, the quadrilateral polygon is divided into two triangular polygons by the other division pattern different from the provisional division pattern (step S59).

When the result of judgement of the value of the division type data at step S58 is that the value of the division type data is not "1", that is, it is "0", the division is designated to give a convex shape. Therefore, the quadrilateral polygon is divided into two triangular polygons by the other division pattern different from the provisional division pattern.

If the division of the quadrilateral polygon ends at step S57 or step S59, the division processing ends and the routine returns to the display processing shown in FIG. 7.

Next, another example of the polygon division processing will be explained.

Figure 23:
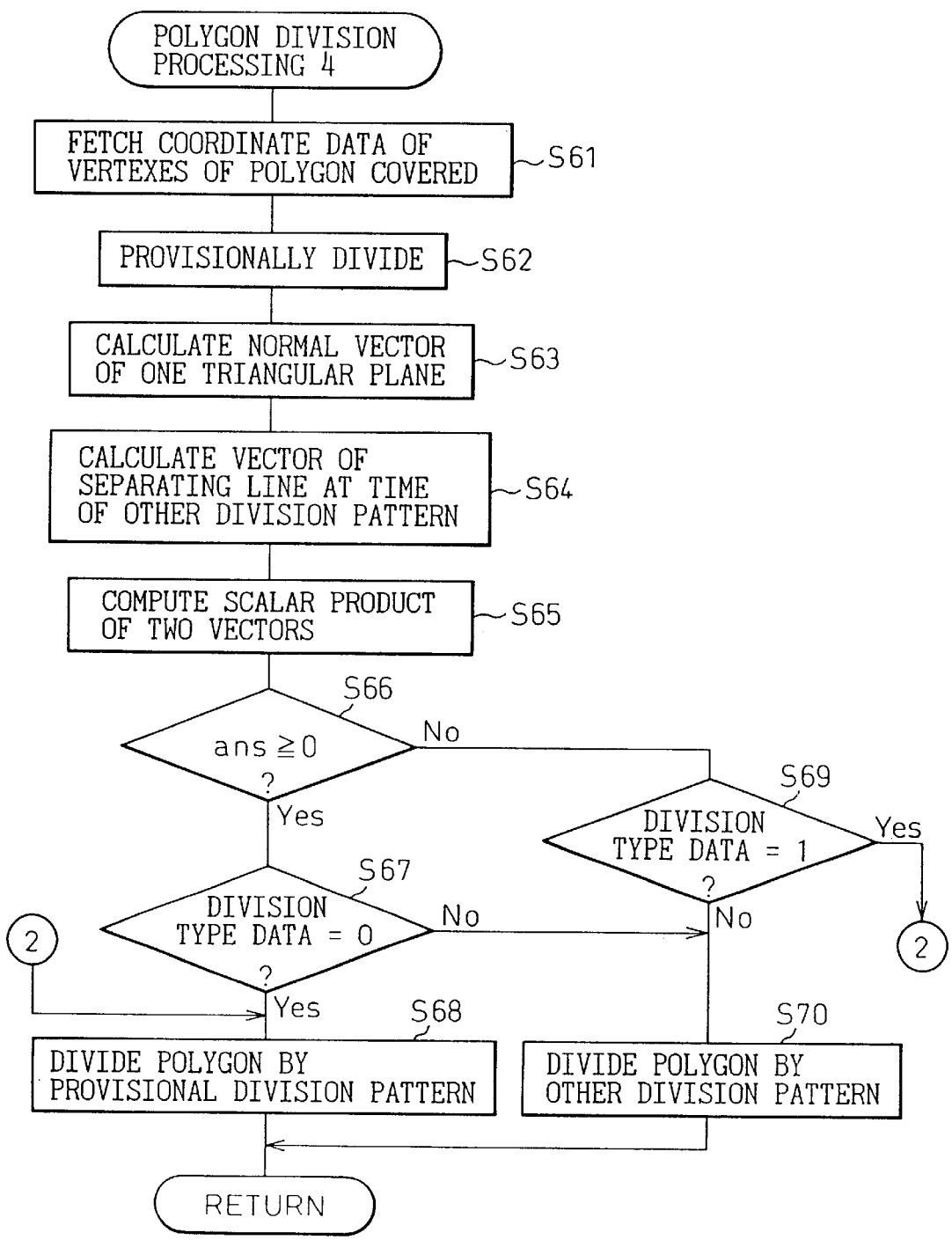
FIG. 23 is a flow chart of another example of the polygon division processing of the second embodiment.

FIG. 23 is a flow chart of another example of the polygon division processing.

When the division processing is started, fist, the ID nos. of the vertexes comprising the quadrilateral polygon to be divided are obtained from the polygon table 23. Next, the coordinate data corresponding to the vertex ID nos. are obtained from the temporary data of the coordinate data stored in the work area 12c of the RAM 12 (step S61).

Based on the obtained coordinate data of the four vertexes, the quadrilateral polygon is provisionally divided into two triangular planes by a straight line connecting a pair of facing vertexes (step S62). Further, the normal vector for one triangular plane among the two triangular planes is found by external product computation (step S63).

Next, the vector of the separating line is found based on the coordinates of the vertexes at the two ends of the separating line in a different division pattern different from the provisional division pattern (step S64). Next, the inner product ans of the normal vector found at step S63 and the vector found at step S64 is calculated (step S65).

Next, it is judged if the value of the ans found is equal to or greater than zero (step S66). When the value of ans is larger than zero, the provisionally divided two triangular planes are in a convex relationship facing the outside of the three-dimensional object. When the value of ans is smaller than zero, the provisionally divided two triangular planes are in a concave relationship facing the outside of the three-dimensional object. When the value of ans is zero, the quadrilateral polygon is a plane.

When the value of ans is zero or more at step S66, the polygon table 23 is referred to. Next, it is judged if the value of the corresponding division type data is "0" (step S67). If the value of the division type data is "0", the division is designated to give a convex shape, so the quadrilateral polygon is divided into two triangular polygons as in the provisional division pattern (step S68).

On the other hand, when the value of ans is smaller than zero at step S66, the polygon table 23 is referred to. Next, it is judged if the value of the corresponding division type data is "1" (step S69). If the value of the division type data is "1", the division is designated to give a concave shape, so the routine proceeds to step S68 where the quadrilateral polygon is divided into two triangular polygons as in the provisional division pattern.

When the result of judgement of the value of the division type data at step S69 is that the value of the division type data is not "1", that is, it is "0", the division is designated so that the polygon forms a convex shape, so the routine proceeds to step S70. Therefore, the quadrilateral polygon is divided into two triangular polygons by another division pattern different from the provisional division pattern. From step S67, when the division type data ≠0, that is, it is "1", the routine proceeds to step S70.

If the division of the quadrilateral polygon ends at step S68 or step S70, the division processing ends and the routine returns to the display processing shown in FIG. 7.

The polygon division processing shown in FIG. 23 simplifies the computation step from the polygon division processing shown in FIG. 22, so it is possible to end the division processing at a higher speed. Therefore, the polygon division processing shown in FIG. 23 is particularly effective when there are a large number of polygons comprising the three-dimensional object or when there are a large number of three-dimensional objects to be displayed simultaneously.

According to the second embodiment, when drawing and recording a quadrilateral polygon designated for division among the plurality of polygons comprising a three-dimensional object, the quadrilateral polygon is provisionally divided into two triangular planes. It is judged if these two triangular planes form a convex shape or concave shape facing the outside of the three-dimensional object.

If the result is that the division types designated in advance match, the quadrilateral polygon is divided by the provisional division pattern. If they do not match, the quadrilateral polygon is divided by the other division pattern. Therefore, the quadrilateral polygon designated for division is divided into two triangular planes so that it becomes the predesignated concave/convex shape facing the outside of the three-dimensional object.

Due to this, the location of the three-dimensional object displayed by the quadrilateral polygon is displayed so that the polygon becomes convex in shape if it is designated that it become convex in shape facing the outside. Further, it is displayed so that the polygon becomes concave in shape if it is designated that it become concave. Therefore, the three-dimensional object can be displayed more naturally. Further, it is possible to display the mode of change of the form of the three-dimensional object without a strange feeling.

Further, according to the second embodiment, the programs of the image processing and polygon division processing are stored in the program product 4, that is, the CD-ROM. Therefore, the program product 4 can be easily distributed and sold separately from the console 2 as a software product. Further, by using a computer or other hardware to use this software, it becomes possible to easily work the image processing technology of the second embodiment by the hardware.

The present invention was explained in detail above based on the embodiments, but the invention is not limited to these embodiments. Suitable changes may of course be made within the scope of the invention.

For example, in the above embodiments, the explanation was made of the case of realization of the present invention using a home game system as a platform. The present invention, however, may also be realized using a personal computer or other general computer or arcade game machine as a platform. Further, the present invention may also be realized using a cellular phone, hand held data terminal, car navigation system, or other communications terminal as a platform.

Further, in the above embodiments, the program or data for realization of the present invention was stored in a CD-ROM and that CD-ROM used as a program product. The program product, however, is not limited to a CD-ROM. It may also be a digital versatile disc (DVD) or other computer readable magnetic or optomagnetic medium or semiconductor memory.

Further, the program and data for realizing the present invention are not limited to forms supplied by a CD-ROM or other program product 4 which can be loaded into and unloaded from a game system or computer. That is, the program and data for realizing the present invention may also be of a form downloaded from another apparatus on the network 100 connected through the communications line 99 by the communications interface 17 shown in FIG. 1. Further, the program and data may also be stored in a memory of another apparatus on the network 100 connected through the communications line 99 and that program and data successively stored in the RAM 12 through the communications line 99. Alternatively, the game system 1 may be comprised to enable support of both this mode of use and use of a CD-ROM.

Summarizing the effects of the invention, according to the present invention, the concave/convex relationship of two triangular planes of a quadrilateral polygon divided into two triangular planes with a straight line connecting a pair of facing vertexes used as a ridge line from among the plurality of polygons comprising a three-dimensional object is judged. Further, since the quadrilateral polygon is divided into two triangular polygons based on the judgement result, it is possible to display by a more natural state the parts displayed by quadrilateral polygons of the three-dimensional object. Therefore, it is possible to display the mode of change of the form of a three-dimensional object without a strange feeling.

While the invention has been described by reference to specific embodiments chosen for purposes of illustration, it should be apparent that numerous modifications could be made thereto by those skilled in the art without departing from the basic concept and scope of the invention.

The present disclosure relates to subject matter contained in priority Japanese Patent Application No. HEI 11-246471, filed on Aug. 31, 1999, the contents of which are herein expressly incorporated by reference in its entirety.

What is claimed is:

1. A computer readable program product for storing a game program, which product stores a program making the computer:

draw a three-dimensional object comprised of a plurality of polygons including non-planar quadrilateral polygons designated as either concave or convex, judge whether a non-planar quadrilateral polygon, divided into two triangular planes with a straight line connecting a pair of facing vertexes forming a ridge line, is formed in a concave or convex shape about the ridge line, change the ridge line to a straight line connecting the other pair of facing vertexes of the non-planar quadrilateral polygon when it is judged that the non-planar quadrilateral polygon is formed in a concave shape about the ridge line, divide the non-planar quadrilateral polygon by the changed straight line to generate two triangular polygons, and draw the three-dimensional object based on polygons comprising the generated triangular polygons, the ridge line judgement further comprising finding a normal vector of at least one face of the two triangular planes obtained by division by the straight line and using the normal vector of the plane to judge if the non-planar quadrilateral polygon is formed in a concave or convex shape.

2. A computer readable program product for storing a game program making the computer:

draw a game character comprised of a plurality of polygons including non-planar quadrilateral polygons designated as either concave or convex, judge whether a non-planar quadrilateral polygon, divided into two triangular planes with a straight line connecting a pair of facing vertexes forming a ridge line, is formed in a concave or convex shape about the ridge line when changing and drawing the form of the game character in response to an input operation of a player, change the ridge line to a straight line connecting the other pair of facing vertexes of the non-planar quadrilateral polygon when it is judged that the non-planar quadrilateral polygon,is not formed in a designated shape, divide the non-planar quadrilateral polygon by the changed straight line to generate two independent triangular polygons, and draw the game character based on polygons comprising the generated triangular polygons.

3. The computer readable program product as set forth in claim 2, in which the ridge line judgement further comprises judging only when a non-planar quadrilateral polygon designated in advance for processing among the non-planar quadrilateral polygons comprising the game character is formed in a concave or convex shape.

4. The computer readable program product as set forth in claim 2, in which said ridge line judgement further comprises judging if said non-planar quadrilateral polygon is formed in a concave or convex shape facing the outside of the game character.

5. The computer readable program product as set forth in claim 2, further making said computer:

provide the non-planar quadrilateral polygon with corresponding division designation information designating whether to divide the polygon to form a convex shape or form a concave shape facing the outside of the game character and, in the generation of the triangular polygons, dividing said non-planar quadrilateral polygon using one of the straight lines as said ridge line to generate the two triangular polygons based on the judgement result and division designation information provided corresponding to the non-planar quadrilateral polygon.

6. The computer readable program product of claim 2, in which the designated shape comprises a concave shape.

7. The computer readable program product of claim 2, in which the designated shape comprises a convex shape.

8. The computer readable program product as set forth in claim 2, in which the ridge line judgement further comprises finding a normal vector of at least one face of the two triangular planes obtained by division by the straight line and using the normal vector of the plane to judge if the non-planar quadrilateral polygon is formed in a concave or convex shape.

9. A method of image processing comprising:

drawing a game character comprising a plurality of polygons including non-planar quadrilateral polygons designated as either concave or convex, judging whether a non-planar quadrilateral polygon, divided into two triangular planes with a straight line connecting a pair of facing vertexes forming a ridge line, is formed in a concave or convex shape about the ridge line when changing and drawing the form of the game character in response to an input operation of a player, changing the ridge line to a straight line connecting the other pair of facing vertexes of the non-planar quadrilateral polygon when it is judged that the non-planar quadrilateral polygon is not formed in a designated shape, dividing the non-planar quadrilateral polygon by the changed straight line to generate two independent triangular polygons, and drawing the game character based on polygons comprising the generated triangular polygons.

10. The method of claim 9, in which the designated shape comprises a concave shape.

11. The method of claim 9, in which the designated shape comprises a convex shape.

12. The method as set forth in claim 9, in which the judging further comprises judging only when a non-planar quadrilateral polygon designated in advance for processing among the non-planar quadrilateral polygons comprising the game character is formed in a concave or convex shape.

13. The method as set forth in claim 9, in which the judging further comprises finding a normal vector of at least one face of the two triangular planes obtained by division by the straight line and using the normal vector of the plane to judge if the non-planar quadrilateral polygon is formed in a concave or convex shape.

14. The method as set forth in claim 9, in which the judging further comprises judging if said non-planar quadrilateral polygon is formed in a concave or convex shape facing the outside of the game character.

15. The method as set forth in claim 9, further comprising:

providing the non-planar quadrilateral polygon with corresponding division designation information designating whether to divide the polygon to form a convex shape or form a concave shape facing the outside of the game character and, in the generation of the triangular polygons, dividing said non-planar quadrilateral polygon using one of the straight lines as the ridge line to generate the two triangular polygons based on the judgement result and division designation information provided corresponding to the non-planar quadrilateral polygon.

16. An apparatus comprising a computer for controlling a program and a program product storing a program for making the computer control the game, wherein said program makes the computer:

draw a game character comprised of a plurality of polygons including non-planar quadrilateral polygons designated as either concave or convex, judge whether a non-planar quadrilateral polygon, divided into two triangular planes with a straight line connecting the pair of facing vertexes forming a ridge line, is formed in a concave or convex shape about the ridge line when changing and drawing the form of the game character in response to an input operation of a player, change the ridge line to a straight line connecting the other pair of facing vertexes of the non-planar quadrilateral polygon when it is judged that the non-planar quadrilateral polygon is not formed in a designated shape, divide the quadrilateral polygon by the changed straight line to generate two independent triangular polygons, and draw the game character based on polygons comprising the generated polygons.

17. The apparatus of claim 16, in which the designated shape comprises a concave shape.

18. The apparatus of claim 16, in which the designated shape comprises a convex shape.

19. The apparatus as set forth in claim 16, in which the ridge line judgement further comprises judging only when a non-planar quadrilateral polygon designated in advance for processing among the non-planar quadrilateral polygons comprising the game character is formed in a concave or convex shape.

20. The apparatus as set forth in claim 16, in which the ridge line judgement further comprises finding a normal vector of at least one face of the two triangular planes obtained by division by the straight line and using the normal vector of the plane to judge if the non-planar quadrilateral polygon is formed in a concave or convex shape.

21. The apparatus as set forth in claim 16, in which the ridge line judgement further comprises judging if said non-planar quadrilateral polygon is formed in a concave or convex shape facing the outside of the game character.

22. The apparatus as set forth in claim 16, further making the computer:

provide the non-planar quadrilateral polygon with corresponding division designation information designating whether to divide the polygon to form a convex shape or form a concave shape facing the outside of the game character and, in the generation of the triangular polygons, divide said non-planar quadrilateral polygon using one of the straight lines as the ridge line to generate the two triangular polygons based on the judgement result and division designation information provided corresponding to the non-planar quadrilateral polygon.

\* \* \* \* \*

UNITED STATES PATENT AND TRADEMARK OFFICE
CERTIFICATE OF CORRECTION

PATENT NO.     : 6,618,055 B1
DATED          : September 9, 2003
INVENTOR(S)    : Y. Tsuchida et al.

It is certified that error appears in the above-identified patent and that said Letters Patent is hereby corrected as shown below:

Title page,
Item [56], References Cited, FOREIGN PATENT DOCUMENTS, include the following:
-- 6-203172    07/22/94    Japan
   6-348858    12/22/94    Japan
   8-077210    03/22/96    Japan
   11232489    08/27/99    Japan
   3062488     04/28/00    Japan
   6-131471    05/13/94    Japan
   10-11590    01/16/98    Japan
   10198821    07/31/98    Japan --
OTHER PUBLICATIONS, include the following:
-- English Language Abstract of JP 6-203172.
English Language Abstract of JP 6-348858.
English Language Abstract of JP 8-077210.
English Language Abstract of JP 11-232489.
English Language Abstract of JP 3062488.
English Language Abstract of JP 6-131471.
English Language Abstract of JP 10-11590.
English Language Abstract of JP 10-198821. --

Column 20,
Line 34, "polygon, is" should be -- polygon is --.

Signed and Sealed this

Eighth Day of June, 2004

JON W. DUDAS
*Acting Director of the United States Patent and Trademark Office*